(12) United States Patent
Wei et al.

(10) Patent No.: US 12,033,618 B1
(45) Date of Patent: Jul. 9, 2024

(54) RELEVANT CONTEXT DETERMINATION

(71) Applicant: Amazon Technologies, Inc., Seattle, WA (US)

(72) Inventors: Kai Wei, Pittsburgh, PA (US); Thanh Dac Tran, Logan, UT (US); Grant Strimel, Presto, PA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 17/546,502

(22) Filed: Dec. 9, 2021

Related U.S. Application Data

(60) Provisional application No. 63/277,442, filed on Nov. 9, 2021.

(51) Int. Cl.
| | |
|---|---|
| *G10L 15/18* | (2013.01) |
| *G06N 3/08* | (2023.01) |
| *G10L 15/06* | (2013.01) |
| *G10L 15/16* | (2006.01) |
| *G10L 15/22* | (2006.01) |
| *G10L 15/28* | (2013.01) |

(52) U.S. Cl.
CPC ............ *G10L 15/1815* (2013.01); *G06N 3/08* (2013.01); *G10L 15/063* (2013.01); *G10L 15/16* (2013.01); *G10L 15/22* (2013.01); *G10L 15/28* (2013.01); *G10L 2015/228* (2013.01)

(58) Field of Classification Search
CPC ... G10L 15/1815; G10L 15/063; G10L 15/16; G10L 15/22; G10L 15/28; G10L 2015/228; G06N 3/08

USPC .......................................................... 704/232
See application file for complete search history.

(56) References Cited

U.S. PATENT DOCUMENTS

| | | | |
|---|---|---|---|
| 9,754,591 B1 * | 9/2017 | Kumar | G10L 15/22 |
| 10,224,035 B1 * | 3/2019 | Koenig | G06F 40/20 |
| 11,004,454 B1 * | 5/2021 | Srinivasan | G10L 17/04 |
| 11,055,355 B1 * | 7/2021 | Monti | G06F 16/90332 |
| 11,392,827 B1 * | 7/2022 | Rubin | G06N 3/042 |
| 11,776,542 B1 * | 10/2023 | Bueche | G10L 15/1822 |
| | | | 704/231 |
| 11,887,620 B2 * | 1/2024 | Masumura | G06N 3/044 |
| 2005/0049860 A1 * | 3/2005 | Junqua | H04M 1/271 |
| | | | 704/E15.04 |
| 2005/0108012 A1 * | 5/2005 | Roth | G10L 15/08 |
| | | | 704/252 |
| 2005/0187758 A1 * | 8/2005 | Khasin | G10L 15/005 |
| | | | 704/10 |
| 2005/0187767 A1 * | 8/2005 | Godden | G10L 15/08 |
| | | | 704/238 |

(Continued)

*Primary Examiner* — Thuykhanh Le
(74) *Attorney, Agent, or Firm* — Pierce Atwood LLP

(57) ABSTRACT

Techniques for determining and storing relevant context information for a user input, such as a spoken input, are described. In some embodiments, context information is determined to be relevant on an audio frame basis. Context scores for different types of context data (e.g., prior dialog turn data, user profile data, device information, etc.) are determined for individual audio frames corresponding to a spoken input. Based on the corresponding context scores, the most relevant context is stored in a local context cache. The local context cache is updated as subsequent audio frames, of the user input, are processed. The data stored in the context cache is provided to downstream components to perform tasks such as ASR, NLU and SLU.

20 Claims, 16 Drawing Sheets

(56) References Cited

U.S. PATENT DOCUMENTS

| | | | | |
|---|---|---|---|---|
| 2005/0187768 | A1* | 8/2005 | Godden | G10L 15/08 |
| | | | | 704/238 |
| 2011/0184730 | A1* | 7/2011 | LeBeau | G10L 15/30 |
| | | | | 704/235 |
| 2012/0265528 | A1* | 10/2012 | Gruber | G10L 15/183 |
| | | | | 704/235 |
| 2017/0229124 | A1* | 8/2017 | Strohman | G10L 15/183 |
| 2018/0342258 | A1* | 11/2018 | Huffman | G10L 15/02 |
| 2019/0096396 | A1* | 3/2019 | Jiang | G10L 15/02 |
| 2020/0202226 | A1* | 6/2020 | Nagatani | G06N 3/044 |
| 2020/0302368 | A1* | 9/2020 | Mathiesen | G06N 5/02 |
| 2020/0380352 | A1* | 12/2020 | Trim | G06N 3/04 |
| 2021/0027766 | A1* | 1/2021 | Shi | G10L 15/063 |
| 2021/0042800 | A1* | 2/2021 | Chandra | H04L 51/02 |
| 2021/0074295 | A1* | 3/2021 | Moreno | G10L 15/005 |
| 2021/0090572 | A1* | 3/2021 | Mahmood | G06F 3/167 |
| 2021/0097982 | A1* | 4/2021 | Nowak-Przygodzki | G10L 15/22 |
| 2021/0133509 | A1* | 5/2021 | Wall | A61B 5/16 |
| 2021/0158801 | A1* | 5/2021 | Park | G10L 25/51 |
| 2021/0241040 | A1* | 8/2021 | Tong | G06F 18/2148 |
| 2021/0271826 | A1* | 9/2021 | Wang | G10L 15/005 |
| 2021/0312399 | A1* | 10/2021 | Asokan | G10L 15/063 |
| 2021/0343277 | A1* | 11/2021 | Jaber | G10L 15/08 |
| 2022/0124056 | A1* | 4/2022 | Cress | G06F 40/35 |
| 2022/0137917 | A1* | 5/2022 | Tiwari | G10L 21/003 |
| | | | | 704/260 |
| 2022/0264180 | A1* | 8/2022 | Brannon | H04N 21/845 |
| 2022/0270597 | A1* | 8/2022 | Qiu | G10L 15/22 |
| 2022/0310080 | A1* | 9/2022 | Qiu | G10L 15/063 |
| 2022/0335953 | A1* | 10/2022 | Rikhye | G10L 15/22 |
| 2022/0391595 | A1* | 12/2022 | Shevelev | G06N 3/08 |

* cited by examiner

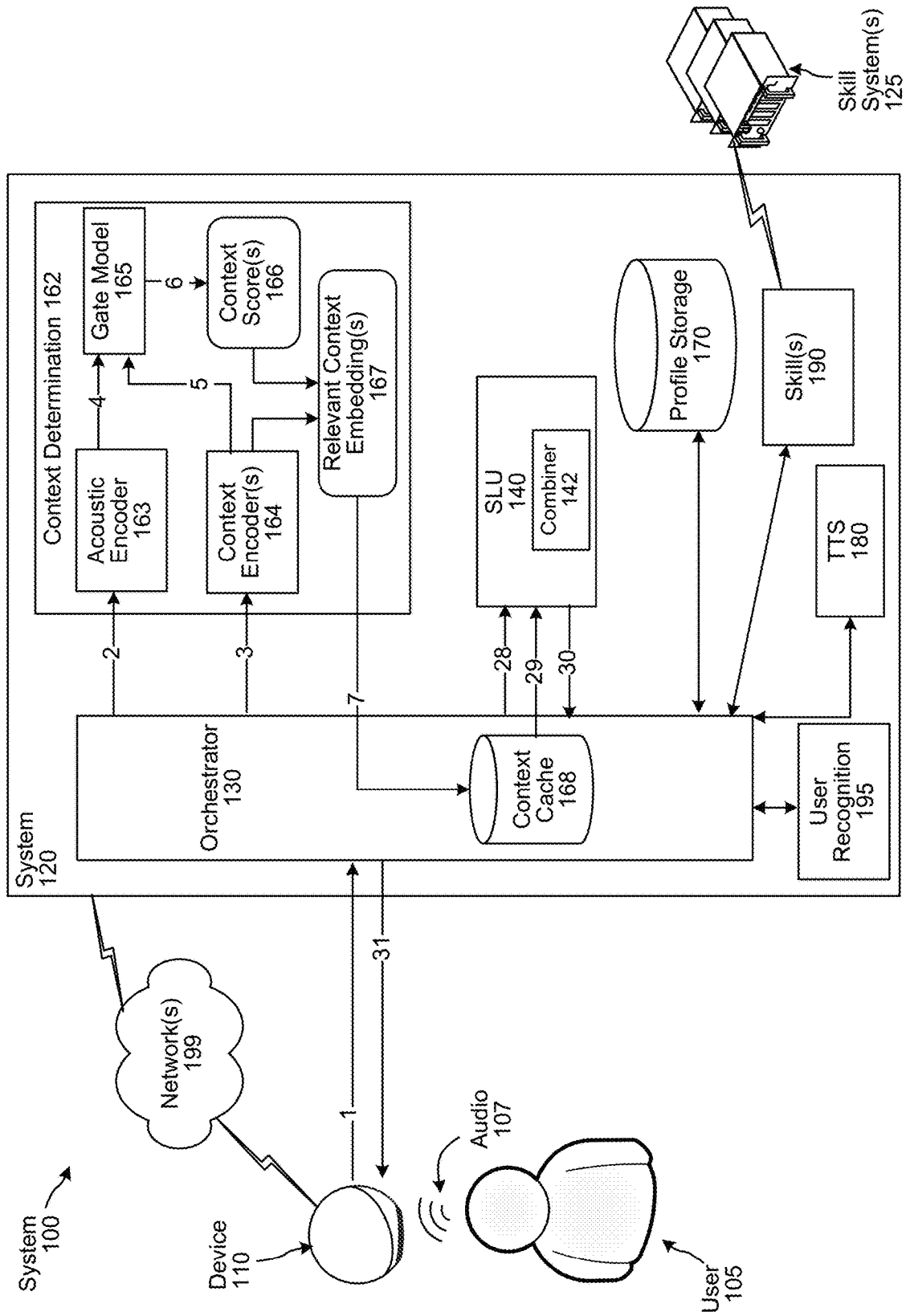

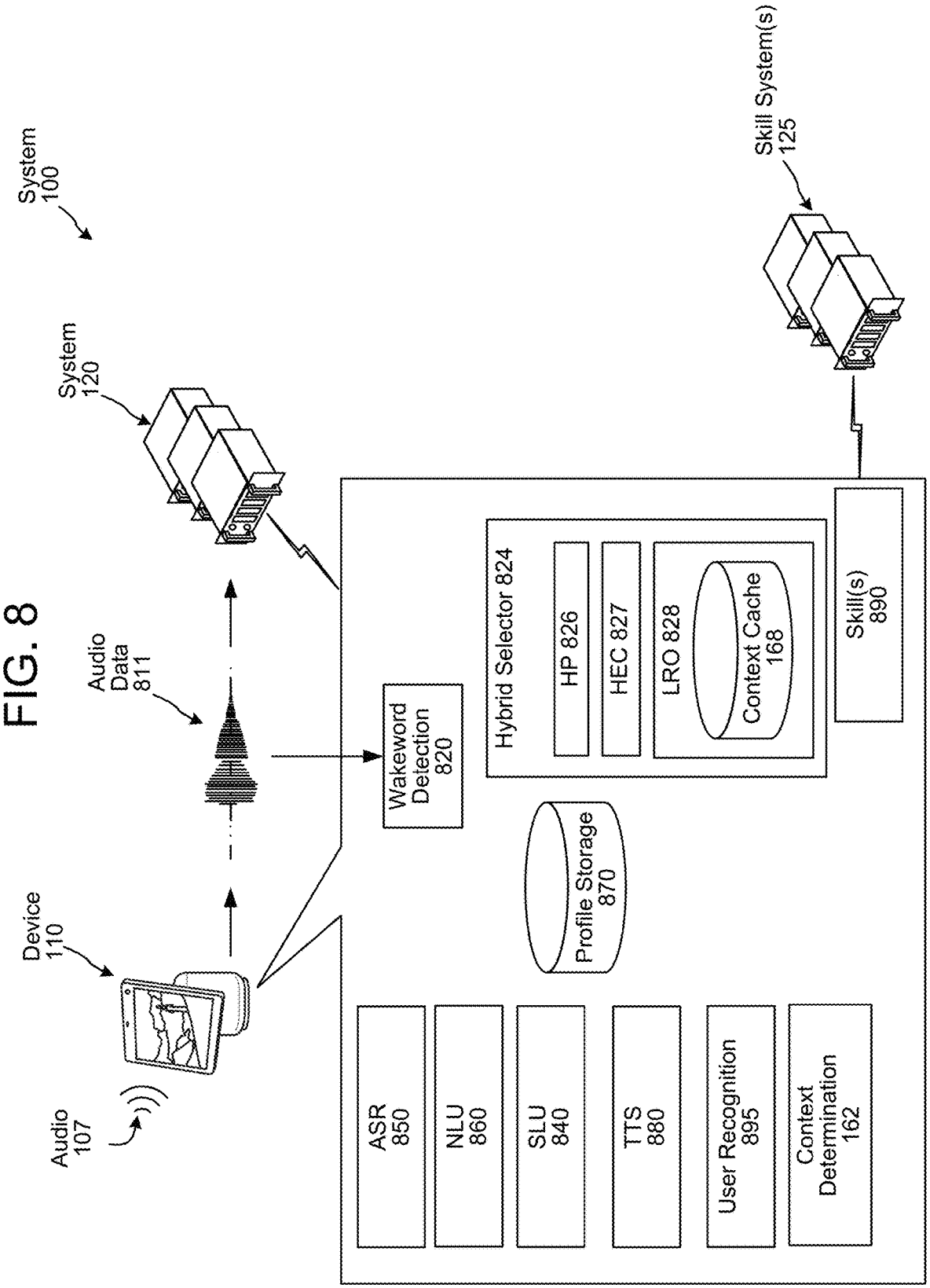

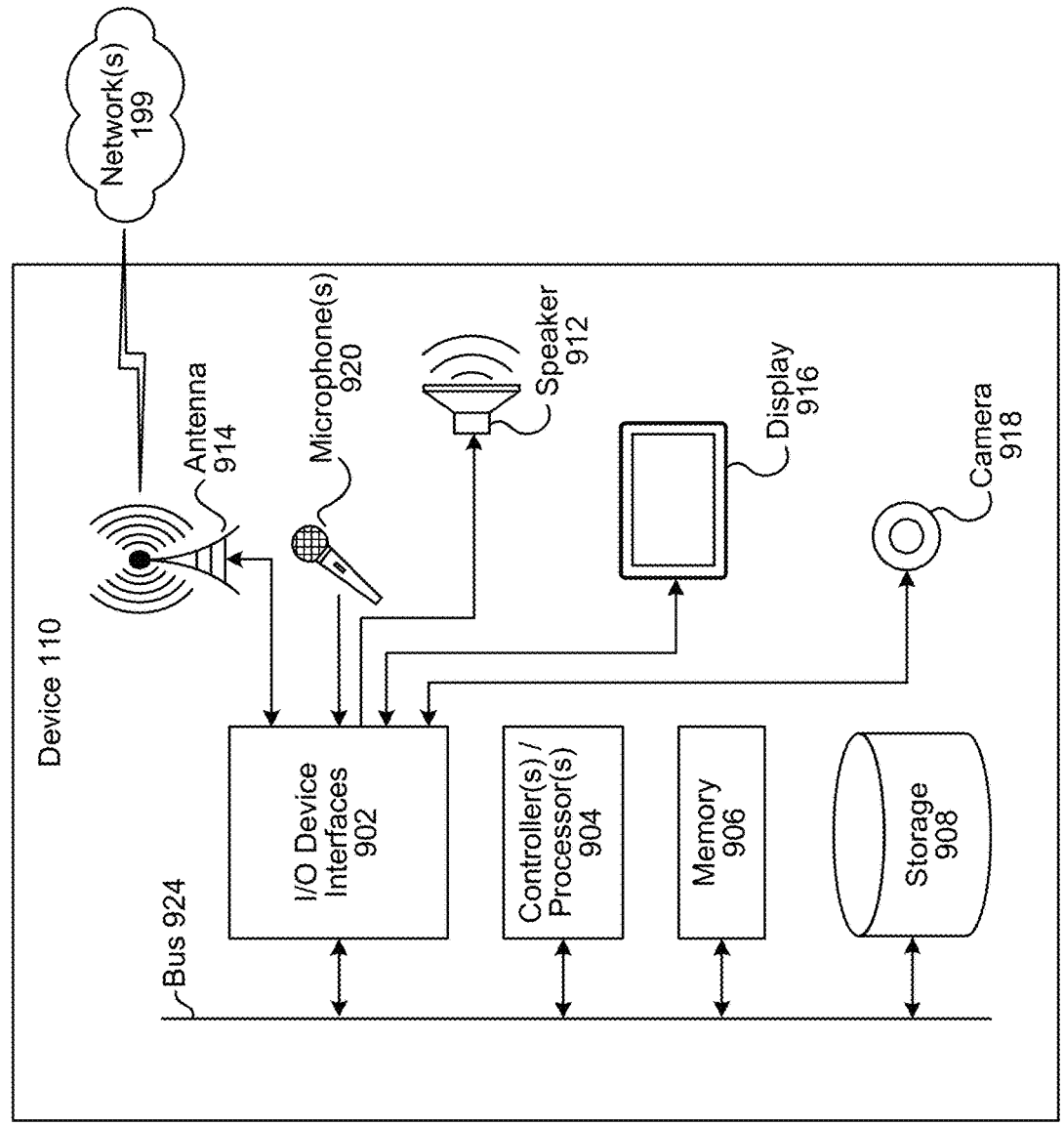

RELEVANT CONTEXT DETERMINATION

CROSS REFERENCE TO RELATED APPLICATION

This application claims the benefit of priority of, U.S. Provisional Patent Application No. 63/277,442, filed Nov. 9, 2021 and titled "MULTI-TURN DIALOG PROCESSING", in the names of Kai Wei, et al., the content of which is expressly incorporated herein by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6A is a conceptual diagram illustrating an example system for determining relevant context data for spoken language understanding (SLU) processing, according to embodiments of the present disclosure.

FIG. 8 is a conceptual diagram illustrating components that may be included in a device, according to embodiments of the present disclosure.

FIG. 9 is a block diagram conceptually illustrating example components of a device, according to embodiments of the present disclosure.

DETAILED DESCRIPTION

Figure 1:
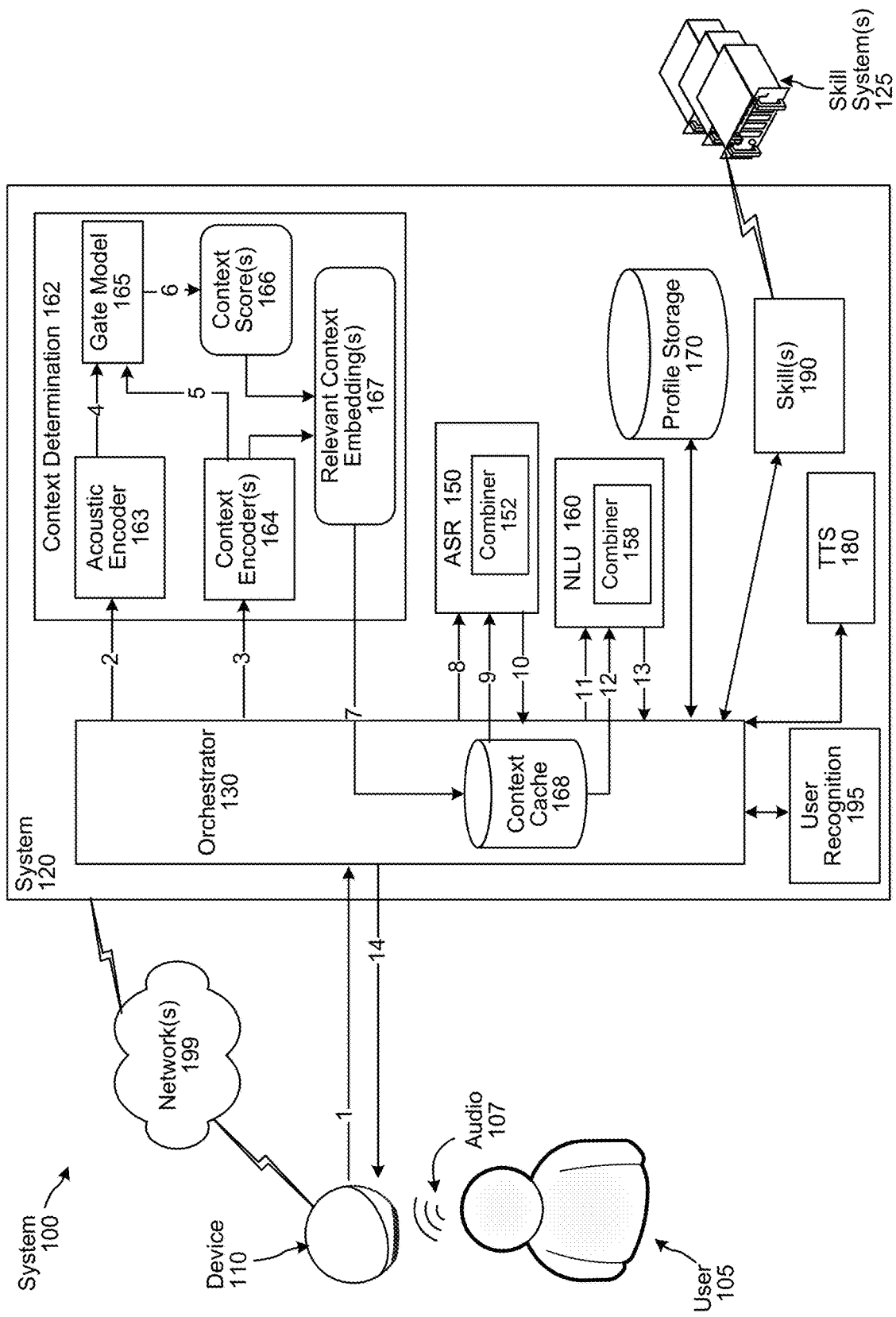
FIG. 1 is a conceptual diagram illustrating an example system for determining relevant context data for automatic speech recognition (ASR) and natural language understanding (NLU) processing, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Spoken language understanding (SLU) involves determining meaning (e.g., intent, entities, etc.) directly from audio including speech. Text-to-speech (TTS) is a field of concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Dialog processing, as used herein, is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems often need to recognize, retain, and use information collected during more than one input during a back-and-forth or "multi-turn" interaction with the user.

The system may be configured to respond to the user across multiple exchanges between the user and the system. For example, the user may say to the system "Order some apples" and the system may respond "what type of apples would you like?" The user may respond "Fuji" and the system may respond "how many Fuji apples do you want?", to which the user may say "Three." Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as purchasing an item). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

Use of context information, such as, previous user inputs, previous system responses, device information, user information, and the like improves ASR, NLU, SLU and dialog processing. Continuing the above dialog example, in the second turn, to clarify the quantity, the system asks "How many Fuji apples do you want?" and the user's answer is "Three." If "three" is treated as a single-turn input (without context information), it is ambiguous since it can mean three apples, three o'clock or something else. However, using context information, the system correctly interprets the user input "Three" as three apples.

In some cases, determining and storing of context information can require large amounts of data and computing resources. Some systems are configured to perform speech recognition tasks on a user's device. As such, efficient determining and storing of context information is beneficial as devices usually have limited computing resources. For example, a system may provide in-car navigation features and, to effectively support this functionality, local devices (e.g., installed within the car) need to consider the user situation in real time while the device/car is in use. This means that local devices may need to store millions of location addresses and also track dialogue contexts related to user's activities, device location, etc. resulting in large data requirements.

The present disclosure relates to determining which of a large amount of context information is relevant to a current user interaction, and storing and providing the relevant portions of context information for various processing tasks. Techniques of the present disclosure involve a machine learning (ML) model (referred to herein as "gate model") trained to recognize which context information is relevant based on input from a user. The gate model can weigh the contribution of context information, apply weights/scores to the context information, and select the top-N relevant context information to be stored and used. Techniques of the present disclosure may be referred to as "selective memory" for context information, which can reduce the data and computing resources usage.

By not indiscriminately using all available context information when processing user inputs, embodiments of the present invention can provide more accurate system responses. For example, embodiments of the present disclosure can determine and output relevant context information to the speech processing components, and thus, improve accuracy.

In some embodiments, the gate model can be integrated with ML-based (e.g., neural network-based) ASR and NLU, or other SLU techniques. For example, the gate model may provide selected relevant context data to an ASR component or an SLU component to integrate context data into input audio frames. As another example, the gate model may provide selected relevant context data to an NLU component to integrate context data into determining intents and entities corresponding to a user input.

Teachings of the present disclosure can improve user privacy, latency issues, and reliability issues, thus providing an improved user experience. User privacy is improved as a device can determine and store selected amounts of context data, rather than a large amount of data. Latency is reduced as a device can process user inputs locally rather than sending data to a cloud engine, a server etc. for processing. Reliability is increased as local device processing can prevent service interruptions when network connectivity outages occur (e.g., when the device is on a boat/cruise ship at sea, when the device is in a car, etc.).

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 is a conceptual diagram illustrating an example system 100 for using selective context data in speech processing, in accordance with example embodiments. As shown in FIG. 1, the system 100 may include a device 110, local to a user 105, connected to a system 120 across one or more networks 199. The network(s) 199 may include the Internet and/or any other wide- or local-area network, and may include wired, wireless, and/or cellular network hardware.

Although the figures and discussion of the present disclosure illustrate certain steps in a particular order, the steps described may be performed in a different order (as well as certain steps removed or added) without departing from the present disclosure.

The system 120 may include multiple components to facilitate speech processing, such as, an orchestrator component 130, an ASR component 150, an NLU component 160, and a context determination component 162. The system 120 may include one or more other skill components 190, which may be in communication with a skill system(s) 125 external to the system 120. The system 120 may also include, as described later herein, a profile storage 170, a TTS component 180, and a user recognition component 195 to facilitate processing of users inputs and generating outputs.

Referring to FIG. 1, the user 105 may speak an input, and the device 110 may capture audio 107 representing the spoken user input. For example, the user 105 may say "Order some apples" or "Add some apples to my shopping cart." In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the user input to the system 120 for processing. The user input, received at step 1, may be associated with a session identifier corresponding to a session.

The orchestrator component 130 may receive the input data from the device 110. The orchestrator component 130 may cause determination and storage of context data for the instant session. To do so, the orchestrator component 130 may send (step 2) the input data, for example, the audio data corresponding to the audio 107, to the context determination component 162. The orchestrator component 130 may also send (step 3) context data to the context determination component 162, where the context data includes all available context information corresponding to the session, the user 105 and the device 110. Examples of the context data, provided at step 3, are described below.

Context data corresponding to the session may include data (e.g., ASR data and NLU data) corresponding to user inputs of one or more previous turns of the instant session; and data (e.g., action performed, natural language response, skill component invoked, etc.) corresponding to system responses of one or more previous turns of the instant session.

Context data corresponding to the user 105 may include user profile data stored at the profile storage 170 and associated with the user 105. The user profile data may include user preferences (e.g., preferred skill components, preferred media items (e.g., music, movies, books, etc.), preferred devices, preferred locations, etc.), which may be explicitly indicated by the user 105 or may be implicitly derived by the system 120 based on past interactions between the user 105 and the system 120. The user profile data may further include information about the user 105, such as, name, age, gender, and other demographic information. The user profile data may also include data (e.g., ASR data, NLU data, system responses, skill components invoked, user feedback, etc.) corresponding to past interactions (for past sessions) between the user 105 and the system 120. The user profile data may also include information representing one or more devices 110 associated with the user 105. The context data corresponding to the user 105 may further include the user's current location, the time when the user input is received, user identity information (as determined by the user recognition component 195), etc.

Context data corresponding to the device 110 may include device information, such as, device type, device identifier, device location (e.g., geographic location and/or relative location within a user's environment, such as a household), device input/output capabilities, device processing capabilities, a network the device is connected to, etc. The context data corresponding to the device 110 may also include data representing one or more skill components 190 enabled/installed at the device 110, one or more user profiles associated with the device 110, etc.

The context determination component 162 may be configured to determine which of the received context data (in step 3) is relevant to the user input (received in step 1). The context determination component 162 may include an acoustic encoder 163 that may process audio data (received in step 2) and determine audio embedding data. In the case the user input is other than a spoken input, the context determination component 162 may use another type of encoder to process the input data and determine corresponding input embedding data. The audio embedding data may be provided (step 4) to a gate model 165. In some embodiments, the acoustic encoder 163 may be implemented outside of the context determination component 162, and the context determination component 162 may receive (at step 2) the audio embedding data, instead of the audio frame.

The context determination component 162 may also include one or more context encoders 164. In some embodiments, a single context encoder 164 may process different types of context data. In other embodiments, a different context encoder 164 may be used to process a different type of context data. The context encoder(s) 164 may process the context data, from the orchestrator component 130, and determine context embedding data. The context embedding data may include embedding data corresponding to different types of context data, such as, session context data, user context data, and device context data. The context embedding data may be provided (step 5) to the gate model 165.

The gate model 165 may be configured to determine which of the different context data is relevant to the user input based on processing the audio embedding data with respect to the context embedding data. In some embodiments, the gate model 165 may determine a similarity between the audio embedding data and different portions of the context embedding data, where each portion corresponds to different context data. The gate model 165 may determine a context score(s) 166 corresponding to each different context data and the audio embedding data. In some embodiments, the context score(s) 166 may represent a similarity between the audio embedding data and the portion of the context embedding data. In other embodiments, the context score may represent a likelihood of the portion of the context embedding being relevant to the audio embedding data. The context score(s) 166 may be a vector including a context score for each different context data. In some embodiments, the context determination component 162 may determine one or more top (best) context scores 166. The context score(s) 166 may be the N-highest (or N-lowest, depending on system configuration) context scores, and as such, may correspond to the N-best/top-N context data relevant to the user input.

The context determination component 162 may determine relevant context embedding(s) 167 using the context embedding data (from the context encoder(s) 164) and the context score(s) 166 (from the gate model 165). The relevant context embedding(s) 167 may be, in some embodiments, a dot product between the context score(s) 166 and the context embedding data from the context encoder(s) 164, which may result in certain portions of the context embedding data to be "amplified" while other portions of the context embedding data to be "reduced." Some of the context scores 166 may be "0", which may cause the corresponding context embedding data to be nulled/zeroed out. The context determination component 162 may send (step 7) the relevant context embedding(s) 167 to the orchestrator component 130, which may store the relevant context embedding(s) 167 in a context cache 168. Further details of the context determination component 162 are described in detail herein below with respect to FIGS. 2-4.

Continuing with the example dialog above where a first user input is "Order some apples," assume that the third user input "Three" is received in step 1 by the system 120. Audio data representing "three" may be provided to the acoustic encoder 163. The context data provided to the context encoder(s) 164 may include a combination of two or more of user context data, device context data, and session context data corresponding to the previous two turns of the example dialog. The context embedding data, determined by the context encoder(s) 164, may correspond to the user context data, the device context data, and the session context data. The gate model 165 may determine at least three context scores 166 based on processing the context embedding data with respect to the audio embedding data, where the context scores may be a first context score 166a corresponding to the user context data, a second context score 166b corresponding to the device context data, and a third context score 166c corresponding to the session context data. The first and second context scores may be "0", while the third context score may be "0.8". For example, the context scores 166 may be the vector {0, 0, 0.8}. The relevant context embedding(s) 167 may be a dot product of the context scores 166 and the context embedding data, and the relevant context embedding(s) 167 to include the session context data, and not to include the user context data and the device context data. Moreover, the session context data may be considered with a reduced effect (e.g., based on the 0.8 context score), when processing the user input "three." The relevant context embedding(s) 167 including the session context data may be stored in the context cache 168, and may be provided to other components for processing the user input as described below. Thus, in this example, the user context data and the device context data is not stored and removed from consideration in processing the user input, and only the session context data is used. This reduces the amount of context data stored, and also reduces the amount of context data processed by downstream components. Moreover, the relevant context embedding(s) 167 also helps downstream components to focus their processing on relevant context, which may improve processing accuracy and the user experience.

In the case that the input data is audio data, the orchestrator component 130 may send (step 8) the audio data to the ASR component 150 and may also send (step 9) the stored relevant context embedding(s) 167 from the context cache 168 to the ASR component 150. The ASR component 150 may process the audio data and the received context data to determine ASR data (e.g., token data, text data, one or more ASR hypotheses including token or text data and corresponding confidence scores, etc.) corresponding to the words spoken by the user 105. The ASR component 150 may use the context data to apply "attention" to portions of the audio data to determine ASR data that may be more accurate. The ASR component 150 may use one or more attention mechanisms configured to enhance important parts of the audio data based on the context data, so that the ASR component 150 selectively concentrates on that particular part of the audio data and devotes more computing power to that particular part of the audio data.

In some embodiments, the ASR component 150 may include a combiner component 152 configured to combine the relevant context embedding(s) 167 and audio embeddings corresponding to the audio data. In some embodiments, the orchestrator component 130 may send the audio embeddings outputted by the acoustic encoder 163 to the ASR component 150. In some embodiments, the acoustic encoder 163 may be implemented outside of the context determination component 162, and the output of which may be used by one or more of the components shown in FIG. 1. In some embodiments, the combiner 152 may concatenate the audio embeddings and the relevant context embedding(s) 167. In other embodiments, the combiner 152 may perform an element-wise addition of the audio embeddings and the relevant context embedding(s) 167. In yet other embodiments, the combiner component 152 may combine the audio embeddings and the relevant context embedding(s) 167 using an attention mechanism.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data with models for sounds (e.g., subword units, such as phonemes, etc.) and sequences of sounds to identify words that match the sequence of sounds of the speech represented in the audio data. The ASR component 150 may send (step 10) the ASR data to the orchestrator component 130.

In at least some instances, instead of the device 110 receiving a spoken natural language input, the device 110 may receive a textual (e.g., typed) natural language input. The device 110 may determine text data representing the textual natural language input, and may send the text data to the system 120, wherein the text data is received by the orchestrator component 130.

The orchestrator component 130 may send (step 11) the text data or ASR data, depending on the type of natural language input received, to the NLU component 160. The orchestrator component 130 may send (step 12), to the NLU component 160, the stored relevant context embedding(s) 167 from the context cache 168. The NLU component 160 may process the ASR data/text data and the relevant context embedding(s) 167 to determine NLU data (e.g., intent data, entity data, domain data, one or more NLU hypotheses including an intent, one or more entities, and corresponding confidence score.) corresponding to the user input provided by the user 105. The NLU component 160 may use the relevant context embedding(s) 167 to apply "attention" to portions of the ASR data/text data to determine NLU data that may be more accurate. The NLU component 160 may use one or more attention mechanisms configured to enhance important parts of the ASR data/text data based on the context data, so that the NLU component 160 selectively concentrates on that particular part of the ASR data/text data and devotes more computing power to that particular part of the data.

In some embodiments, the NLU component 160 may include a combiner component 158 configured to combine the relevant context embedding(s) 167 and the ASR data (or text data). In some embodiments, the combiner 158 may concatenate the ASR data and the relevant context embedding(s) 167. In other embodiments, the combiner 158 may perform an element-wise addition of the ASR data and the relevant context embedding(s) 167. In yet other embodiments, the combiner component 158 may combine the ASR data and the relevant context embedding(s) 167 using an attention mechanism.

The NLU component 160 may perform intent classification (IC) processing on the ASR data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR data or text data to determine one or more portions, sometimes referred to as slots, of the natural language input that may be needed for post-NLU processing (e.g., processing performed by a skill). For example, NER processing of the natural language input "play [song name]" may determine an entity type of "Song-Name" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data or text data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR data or text data with respect to a different skill.

The NLU component 160 may send (step 13) the NLU data corresponding to the user input to the orchestrator component 130. The orchestrator component 130 may invoke the skill component 190 by sending the NLU data to the skill component 190. One or more skill components 190 may communicate with one or more skill systems 125. A "skill" may refer to software, that may be placed on a machine or a virtual machine (e.g., software that may be launched in a virtual instance when called), configured to perform one or more actions in response to user inputs processed by the NLU component 160.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain. A "domain" may include various skills relating to a particular area of interest. For example, a music domain may include various skills that can respond to a user's request to play music, enable a user to purchase music, etc. Such skills may be the Amazon Music skill, the Pandora skill, the Spotify skill, etc. In another example, a smart-home domain may include skills that enable a user to control various home devices.

The skill component 190 may send output data responsive to the user input to the orchestrator component 130. The system 120 may include a TTS component 180 that generates audio data including synthesized speech. The data input to the TTS component 180 may come from a skill component 190, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

In some cases, the orchestrator component 130 may send the output data from the skill component 190 to the TTS component 180. The TTS component 180 may send output audio data to the orchestrator component 130, where the output audio data represents synthesized speech corresponding to the output data from the skill component 190.

In some cases, the orchestrator component 130 may send (step 14) the output data from the skill component 190 and/or the output audio data from the TTS component 180 to the device 110 for presenting to the user 105. The output data may include text, icons, images, graphics, or other type of data. The output presented to the user 105 via the device 110 may be visual and/or audible. Alternatively or additionally, the system 120 may send output data to another device 110, associated with the user 105.

As shown in FIG. 1, the system 120 may include the user recognition component 195. The user recognition component 195 may recognize one or more users using various data. The user recognition component 195 may take as input the audio data corresponding to the user input (received in step 1). The user recognition component 195 may perform user recognition by comparing speech characteristics, in the audio data, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 2:
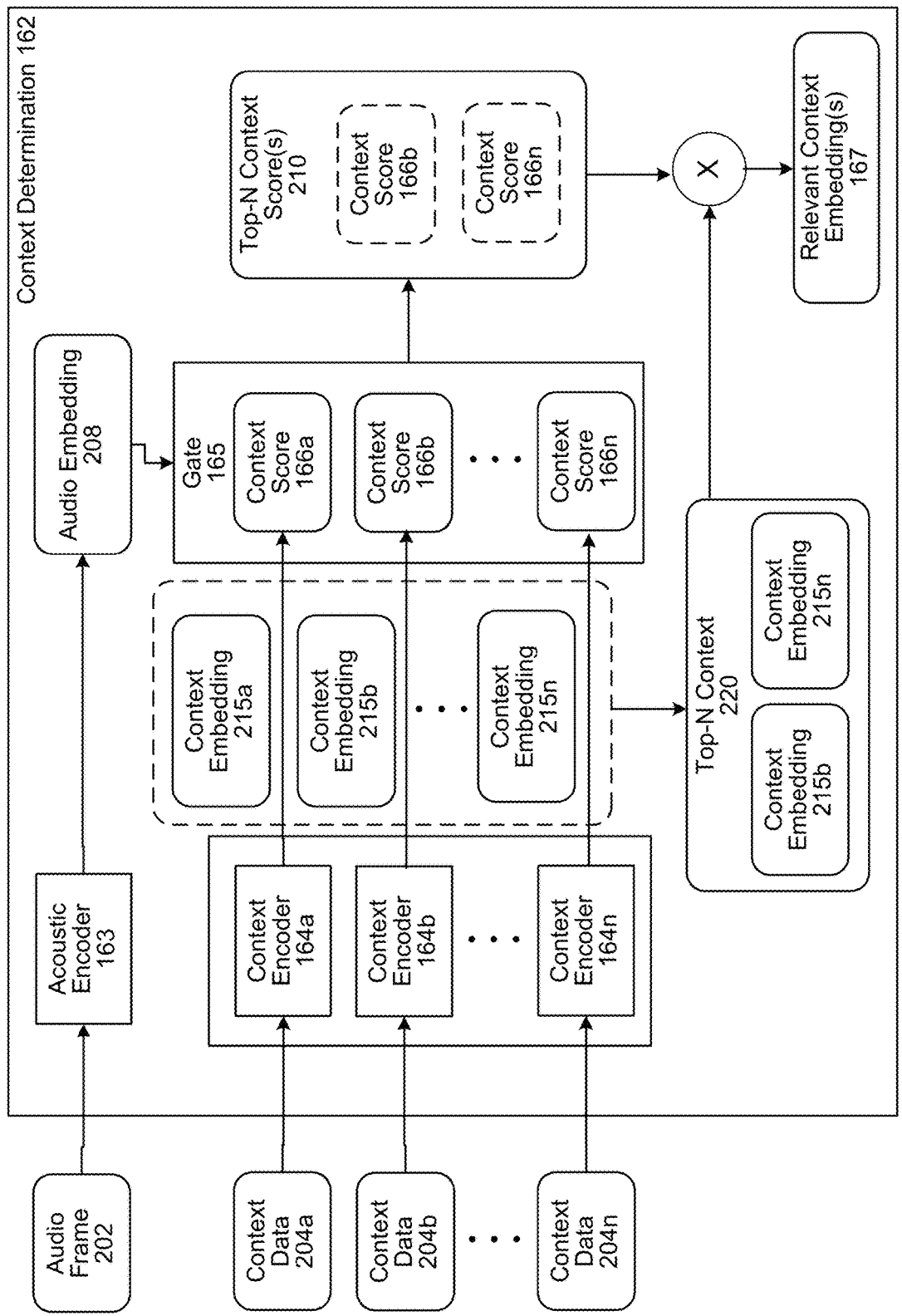
FIG. 2 is a conceptual diagram illustrating an example context determination component, according to embodiments of the present disclosure.

FIG. 2 shows example processing of the context determination component 162. The context determination component 162 may include multiple context encoders 164, where each of the context encoder 164 may be configured to process a different type of context data. For example, context encoder 164a may be configured to process context data 204a (which may be user information), context encoder 164b may be configured to process context data 204b (which may be device information), context encoder 164n may be configured to process context data 204n (which may be dialog turn information), and so on. The context encoders 164 may output encoded context data/context embedding data 215a, 215b . . . 215n for the respective context data 204a, 204b . . . 204n.

The acoustic encoder 163 may process the audio frame 202 to determine audio embedding data 208. The audio frame 202 may be a portion of the audio data corresponding to the audio 107 representing a spoken input from the user 105. The gate model 165 may process the audio embedding data 208 and the context embedding data 215 from the context encoders 164 to determine the context scores 166. The gate model 165 may determine a first context score 166aa based on processing the context embedding 215a and the first audio embedding data 208. Then the gate model 165 may determine a second context score 166ab based on processing the context embedding 215a and second audio embedding 208 corresponding to a second audio frame/second portion of the audio 107. The gate model 165 may determine a context score for each audio frame/portion of the audio 107, and may then determine the context score 166a by aggregating (e.g., summing, averaging, median, mean, etc.) the context scores for the individual audio frames. The context score 166a may represent the context data 204a relevancy/similarity to the entirety of the audio 107/the spoken user input.

The gate model 165 may determine the context score 166 based on a similarity between the respective context embedding data 215a, 215b . . . 215n and the audio embedding data 208. The gate model 165 may be a machine learning model, for example, a neural network. The gate model 165 may use a sigmoid function, a dot product, a distance-based similarity technique, a cosine similarity, etc. to determine the context score 166. The context score 166 may represent how relevant the corresponding context data 204 is to the audio frame 202. The gate model 165 may determine a context score 166 corresponding to each different type of context data. For example, the context score 166a may correspond to the context data 204a, the context score 166b may correspond to the context data 204b, the context score 166n may correspond to the context data 204n, and so on.

The gate model 165 may determine top-N context scores 210 from the context scores 166. The top-N context scores 210 may be the top scoring/best/highest scores from the context scores 166. The value of N is configurable and may be different for different devices, device types, systems, etc. The value of N may be based on computing resources/memory available at the device 110 or the system 120. The top-N context scores 210 may be a subset of the context scores 166, for example, the context scores 166b and 166n may be included, as shown in FIG. 2. In other embodiments, the top-N context scores 210 may include context scores 166 that satisfy a condition (e.g., exceed a threshold value).

The context determination component 162 may determine context embedding(s) 167 using the top-N context scores 210 and the context embeddings 215. The context embeddings 215 may be a dot product (or other type of combination) of the top-N context scores 210 and the corresponding top-N context embeddings 215. In some embodiments, the context determination component 162 may select top-N context 220 to include the context embeddings 215 corresponding to the context scores included in the top-N context scores 210. For example, the top-N context 220 may include the context embeddings 215b and the context embeddings 215n based on the top-N context scores 210 including the context score 166b and the context score 166n. In this example, the relevant context embeddings 167 may include a dot product of the context score 166b and the context embedding 215b, and a dot product of the context score 166n and the context embedding 215n. The relevant context embeddings 167 may be outputted by the context determination component 162, and may be stored in the context cache 168.

The combiner components 152, 158 (and 142 shown in FIG. 6A) may be configured to combine the relevant context embedding(s) 167 (corresponding to the top scoring/relevant context data 204) with input data, such as the audio embedding data 208. The combiner components 142, 152, 158 may use one or more techniques for the combination. In an example embodiment, the combiner component 142, 152, 158 may concatenate (in a serial manner) the relevant context embedding(s) 167 with the audio embedding 208. In another example embodiment, the combiner component 142, 152, 158 may perform an element-wise addition of the relevant context embedding(s) 167 and the audio embedding 208. In yet other embodiments, the combiner component 142, 152, 158 may combine the relevant context embeddings 167 and the audio embedding 208 using an attention model/mechanism that may apply attention to portions of the audio embedding 208 based on the relevant context embeddings 167. The technique used by the combiner component 142, 152, 158 may depend on system configurations, the type of task the context is to be integrated with, the type of input received, etc. For example, for integrating context in an ASR processing task, the combiner component 152 may use an element-wise addition technique. As another example, for integrating context in a SLU processing task, the combiner component 142 may use an attention mechanism.

In some embodiments, the combiner component 142, 152, 158 may be included in the context determination component 162.

Although FIG. 2 illustrates the context determination component 162 taking as input audio embedding data, similar techniques may be used to determine relevant context based on processing of other types of input. For example, the context determination component 162 may process multiple pieces of word embedding data (portions of ASR data, portions of text data, etc.) corresponding to a spoken user input. The gate model 165 may process first word embedding data and the context embedding data 215a to determine a context score 166a, which may represent a relevancy/similarity of the context embedding data 215a to the first word embedding data.

Figure 3:
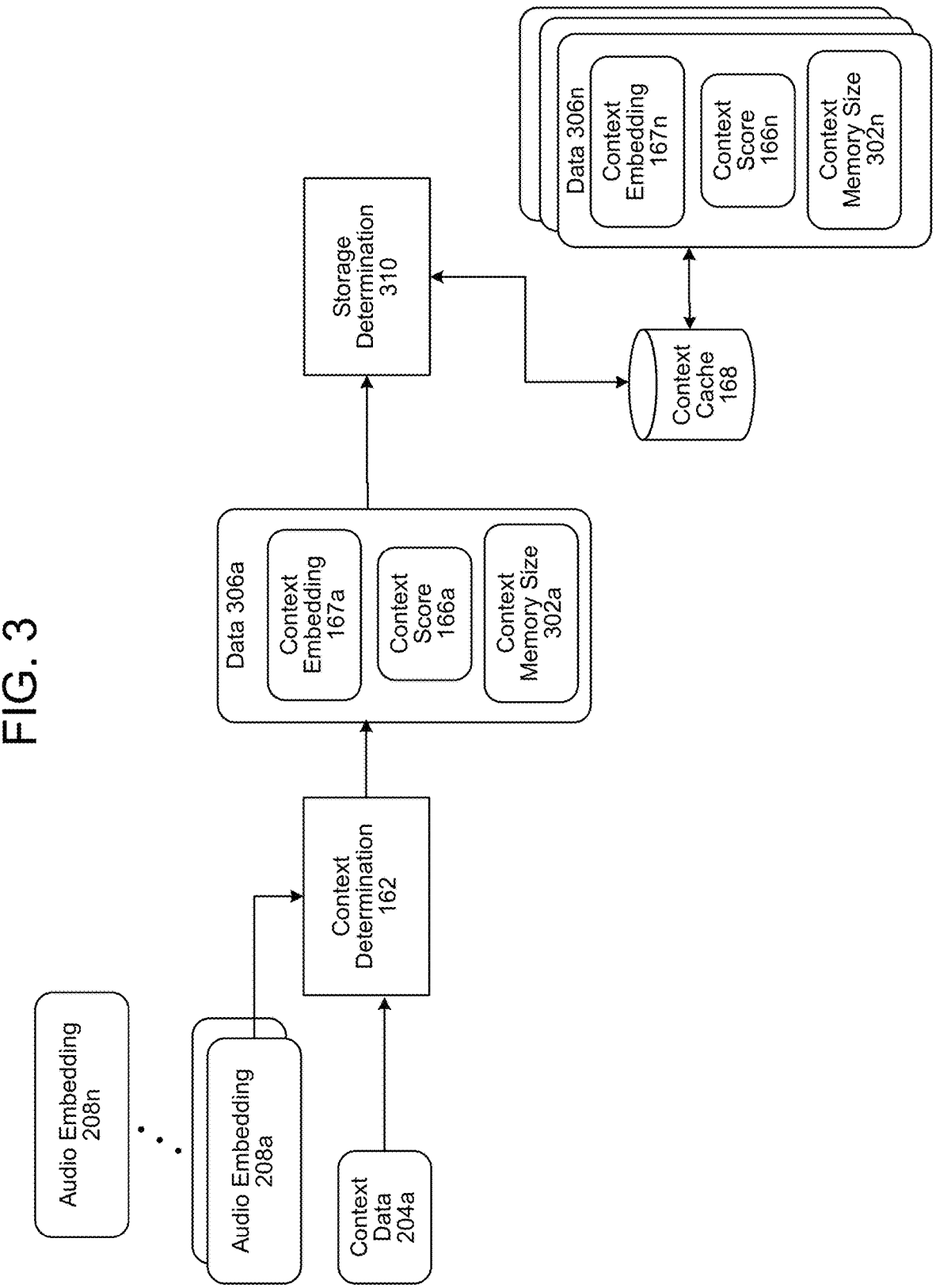
FIG. 3 is a conceptual diagram illustrating an example storage determination component, according to embodiments of the present disclosure.

FIG. 3 is a conceptual diagram illustrating an output of the context determination component 162 and processing performed to determine whether context data is to be stored. As described above, the context determination component 162 may determine context scores based on processing individual audio frames 202 of the audio data received at the device 110 (e.g., the audio data representing a spoken natural language input). The gate model 165 may determine a first context score 166aa based on processing a first audio embedding 208a (corresponding to a first audio frame 202a), a second context score 166ab based on processing a second audio embedding 208b (corresponding to a second audio frame 202b), and so on, until a context score for each audio frame of the input audio data is determined. The context determination component 162 may then determine the context score 166a (representing a relevance/similarity of the context data 204a to the entirety of the input audio data) by aggregating (e.g., summing, averaging, determining the median, determining the mean, etc.) the first context score 166a, the second context score 166ab, etc. As described herein, the context determination component 162 may receive the context data 204a, which may represent one type of context data, and the audio embeddings 208a-208n. In some embodiments, the context determination component 162 may output data 306a corresponding to the context data 204a. The data 306a may include context embedding 215a (determined as described above in relation to FIG. 2) corresponding to the context data 204a. The data 306a may also include the context score 166a corresponding to the context data 204a, and context memory size 302a representing the amount of memory needed to store the context embedding 215a.

In some embodiments, a storage determination component 310 may determine whether or not the data 306a is to be stored in the context cache 168. The storage determination component 310 may be included in the context determination component 162, the orchestrator component 130, or may be a separate component within the system 120 or the device 110. The context cache 168 may store multiple instances of data 306, each corresponding to different context data 204 that may have been determined to be relevant for a previous user input received by the system 120/the device 110, or relevant for a prior audio frame 202 of the audio 107 representing a current user input.

The context cache 168 may store data 306n including the context embedding 215n corresponding to the context data 204n, the context score 166n corresponding to the context data 204n, and context memory size 302n representing the amount of memory needed to store the context embedding 215n. The storage determination component 310 may determine to store the data 306a based on the already stored data 306n.

Figure 4:
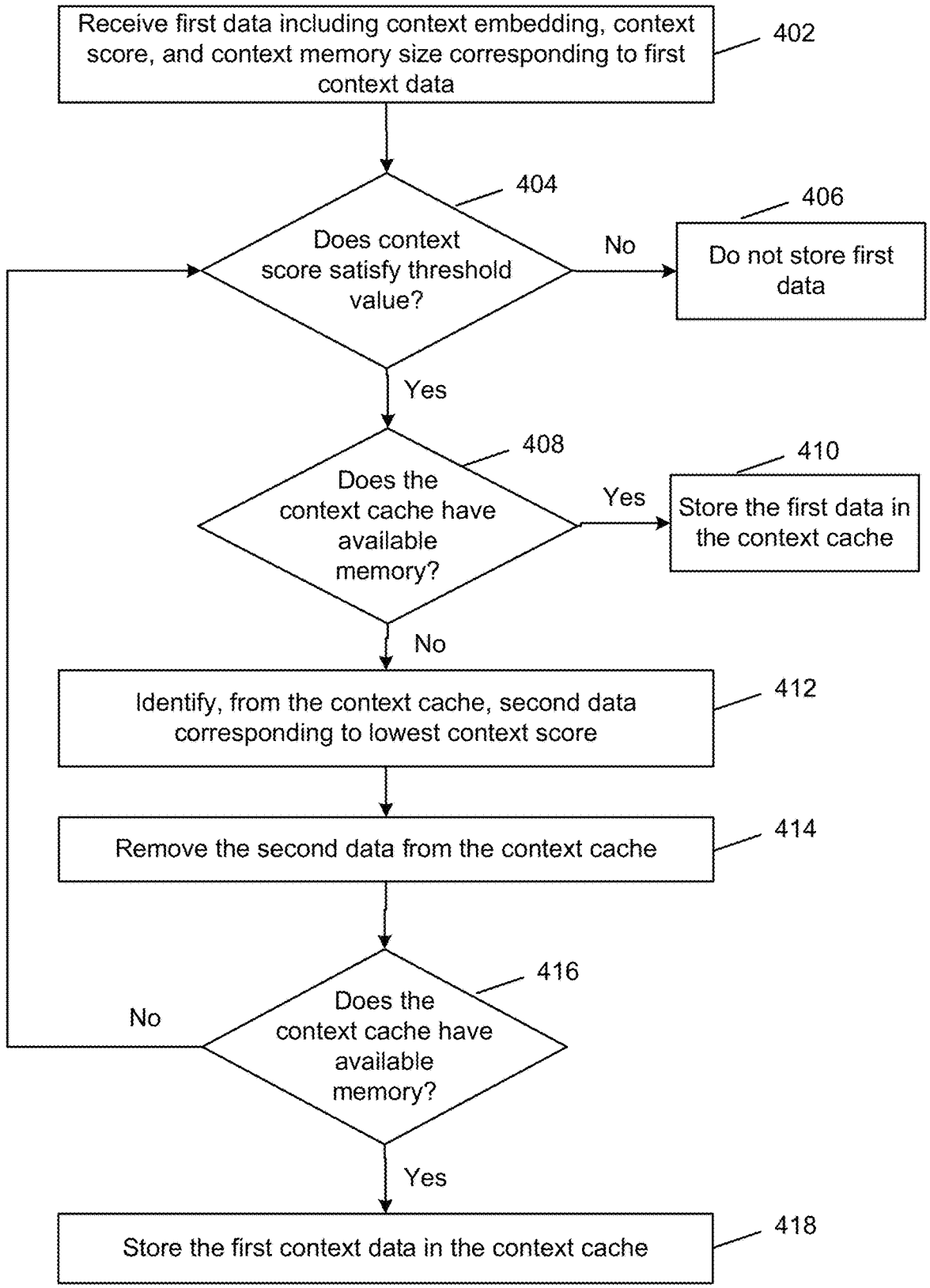
FIG. 4 is a flowchart illustrating a process that may be performed by the storage determination component, according to embodiments of the present disclosure.

FIG. 4 is a flowchart for an example process that may be performed by the storage determination component 310 to determine how the data 306a can be stored in the context cache 168. At a step 402, the storage determination component 310 may receive the context embedding 215a, the context score 166a and the context memory size 302a corresponding to first context data 204a. At a decision step 404, the storage determination component 310 may determine whether the context score 166a for the first context data 204a satisfies a threshold value (e.g., exceeds a threshold value, is below a threshold value, etc.). If the context score 166a does not satisfy the threshold value, then at a step 406, the first context data is not stored in the context cache. In this manner, only context data that is relevant to a certain degree is maintained/stored. The threshold value (at decision step 404) may be based on which processing task the context is used. For example, a first threshold value may be used for an ASR processing task, a second threshold value may be used for an NLU processing task, a third threshold value may be used for an SLU processing task, and a fourth threshold value may be used for dialog act classification task.

If the context score 166a satisfies the threshold value, then at a decision step 408, the storage determination component 310 may determine whether the context cache 168 has memory available. The storage determination component 310 may also determine whether the available memory is enough to store the data 306a based on the context memory size 302a. If there is an appropriate amount of memory available, then at a step 410, the first data 306a is stored in the context cache 168.

If an appropriate amount of memory is not available, then at a step 412, the storage determination component 310 identifies, from the context cache 168, second data 306n corresponding to the lowest context score 166n. At a step 414, the storage determination component 310 may remove the second data 306n from the context cache 168. At a decision step 416, the storage determination component 310 may determine whether there is appropriate memory available to store the first data 306a. If yes, then at a step 418, the first data 306a, corresponding to the first context data 204a and including the context embedding 215a, the context score 166a and the context memory size 302a is stored in the context cache 168. If appropriate memory is not available, then the storage determination component 310 may return to the decision step 404 and may perform process/steps as described above.

In this manner, the storage determination component 310 may store the most relevant context data in the context cache 168. Moreover, the context data stored in the context cache 168 may be updated based on processing of each audio frame 202 corresponding to the spoken input from the user 105. The context determination component 162 may process audio frames 202 in a streaming manner, that is, process the audio frames 202 in the order and as they are received by the context determination component 162. As such, the context cache 168 may be updated in a streaming manner as well.

In some embodiments, the context cache 168 is a heap data structure, and the data 306 may be organized based on the corresponding context scores 166. For example, the lowest context score 166 may be stored at the top/head node of the heap data structure. Removal of the lowest scored context data may be performed in O(1) operations. New data 306a may be inserted in the heap data structure based on the corresponding context score 166a, for example, by inserting a node at the appropriate position such that the context scores 166 prior to the context score 166a may be greater and the context scores 166 after the context score 166a may be lower. Insertion of new context data may be performed in O(log n) operations, where n is the number of nodes/number of different context data stored in the context cache. Use of the heap data structure, enables quick and efficient retrieval of lowest context score data and insertion of new context data.

When a new/subsequent user input is received by the system 120/the device 110, the context cache 168 may be updated. The new user input may be for the current dialog session or for a different/subsequent dialog session. The context cache 168 may already store relevant context data for the user input prior to the subsequent user input. When the subsequent user input is received, the context determination component 162 may process a first audio frame 206A corresponding to the subsequent user input with respect to the already stored context data in the context cache 168 to determine new/updated context scores 166, which represent the relevancy of the already stored context data to the subsequent user input. The heap data structure may be updated/reordered based on the updated context scores. Additionally, the context determination component 162 may process the first audio frame 204a for the subsequent user input with respect to any additional context data 204 provided to the context determination component 162 (e.g., by the orchestrator component 130). Such additional context data 204 may correspond to the subsequent user input, for example, the time the subsequent user input is received, a user/device location, prior dialog turn information, user profile information, etc.

The context determination component 162 processes the first audio frame 204a and the additional context data 204 (as described herein) to determine corresponding context scores 166. The storage determination component 310 may update the context cache 168, as described in relation to FIG. 4, and may store or discard the additional context data based on the corresponding context scores, or may remove context data from the context cache 168 and store the additional context data instead.

Figure 5A:
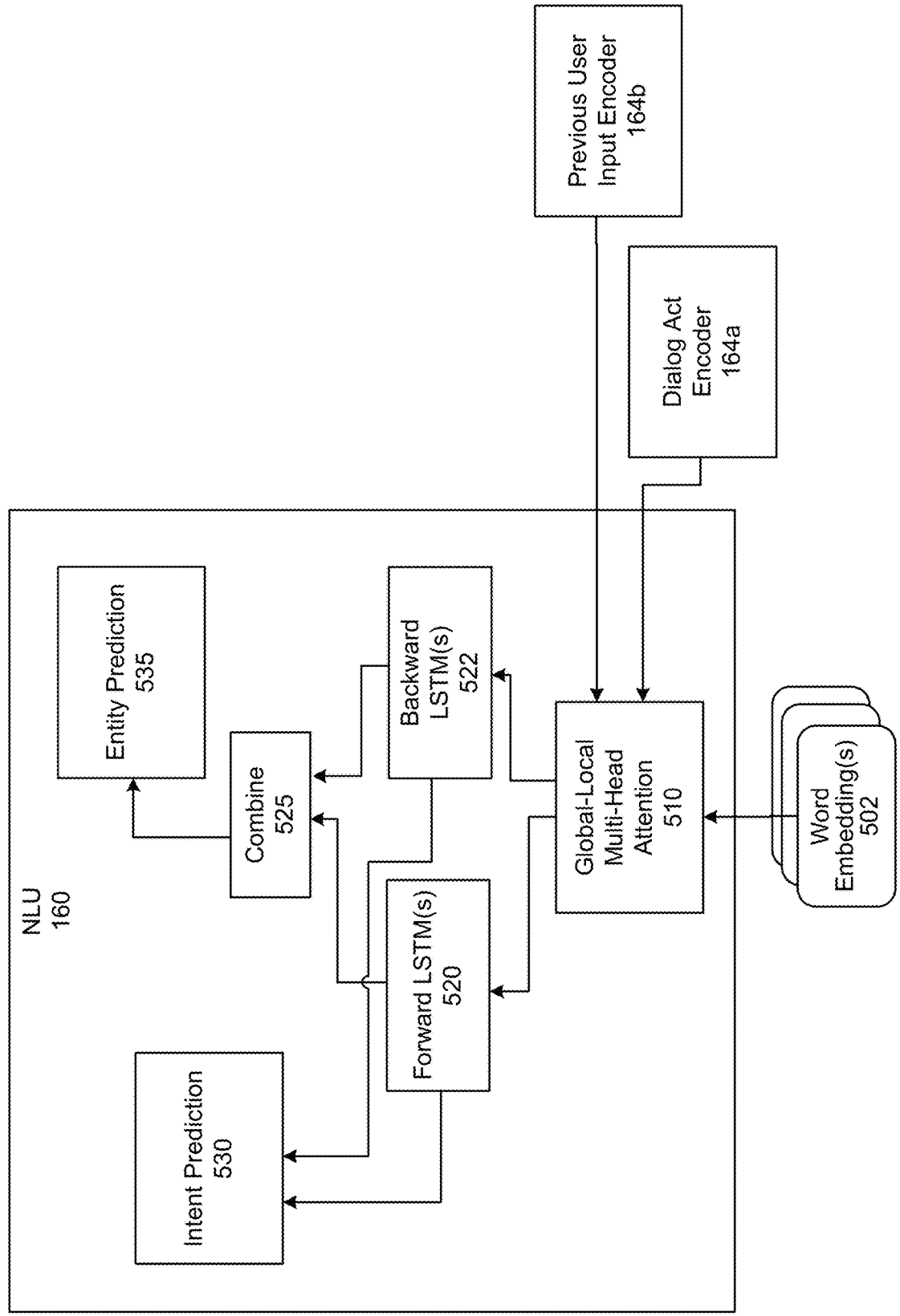
FIG. 5A is a conceptual diagram illustrating an example NLU component integrating context data during processing, according to embodiments of the present disclosure.

FIG. 5A illustrates an example embodiment of the NLU component 160 incorporating context data. In this example embodiment, the NLU component 160 uses session context data including system responses, referred to herein as dialog acts, for the prior dialog turns, and previous user inputs for the prior dialog turns. To incorporate context signals into the NLU component 160, in some embodiments, a global-local multi-head attention component 510 may be included. FIG.

5B shows an example embodiment of the global-local multi-head attention component 510 including a local attention component 560 and a global attention component 562. The local attention component 560 may align each context source information with the user input transcript signals, while the global attention component 562 measures contribution of all context information. In contrast to systems that use Bi-LSTMs to encode previous utterances, the embodiments of the present disclosure use BERT encoders for previous user inputs to obtain enriched semantic representations. In contrast to systems that uses graph-based methods for filtering out irrelevant information, the present disclosure uses the global-local multi-head attention component 510.

The variables may be set up for the NLU component 160 as follows. The NLU component 160 may take as input a current user input $u_t$ and a list of previous dialog acts $D^t = \{(a_1, s_1), \ldots, (a|D^t|, s|D^t|)\}$, and previous user inputs $U^t = \{u_1, u_2, \ldots, u_{t-1}\}$. Each $(a_i, s_i)$ pair shows a dialog action $a_i$ and a dialog slot/entity $s_i$. Given the ground truth intent $y_t^{int}$ of $u_t$ and ground truth slot $y_{t,i}^{slot}$ per each word token $p_t^i \in u_t$, the NLU component 160 aims to maximize the intent probability $P(y_t^{int}|u_t, U^t, D^t)$ for $u_t$, and the slot probability $P(y_{t,i}^{slot}|u_t, U^1, D^t)$ for each transcript token $p_t^i$.

FIG. 5A shows an example architecture of the NLU component 160. At a high-level, the word embedding(s) 502 (e.g., wordpiece embeddings) corresponding to the current user input and based on ASR data determined by the ASR component 150 along with the encoded context of dialog acts and previous user inputs of prior dialog turns are inputted into the global-local multi-head attention component 510. The local attention 560 considers each context encoding type as a separate key and value and the word embeddings 502 as the query, and then assigns attention scores to the context encodings. The global attention 562 serves as a gating layer to produce how much all contexts can contribute to the input query/the word embeddings 502.

Without the global attention 562, the local attention 560 may always give an accumulated attention score of 1.0, as the results of performing a softmax function, which is not optimal. For example, a user may ask a voice assistant system to "call uncle sam", and the system may confirm to see if the user wants to "call a nearby uncle sam's sandwich bar". The user then says in a second turn "call my uncle whose first name is sam". In this case, dialog contexts from the first turn are not helpful for the second turn. The techniques of the present disclosure would reduce the impact of the first turn dialog context in determining NLU data for the second turn of the dialog.

In some embodiments, after attentively incorporating context information into the word embeddings 502, the NLU component 160 may use a stacked 2-layer bidirectional BiLSTM to learn from left-to-right (order of words appearing in the user input) and right-to-left (order of words appearing in the user input), then use the output embeddings for the intent classification task by an intent prediction component 530 and slot filling task by an entity prediction component 535.

In some embodiments, the word embeddings 502 may be generated using a trained word encoder and ASR data corresponding to the current user input. The trained word encoder may be a sentencepiece model. In some embodiments, the trained word encoder may be a pretrained sentencepiece tokenizer configured to tokenize input text data/ASR data, and project the tokenized words into an embedding space to obtain the word embeddings 502 $P^t = \{p_1, p_2, \ldots, p_n\}$, where n is the length of the tokenized user input.

One of the context encoders 164 (shown in FIG. 1) may be a dialog act encoder 164a, and another of the context encoders 164 may be a previous user input encoder 164b. The dialog act encoder 164a may receive as input a list of dialog actions and slot/entity pairs $D^t = \{(a_1, s_1), \ldots, (a|D^t|, s|D^t|)\}$. Given that $l_D$ is the maximum number of dialog action-slot pairs in all training input data instances, if $|D^t| < l_D$, $D^t$ is padded with padding action-slot pairs (non-zero embeddings) until reaching $l_D$. During inference, if an utterance in the testing set has more than $l_D$ action-slot pairs, only the latest $l_D$ pairs may be considered.

In some embodiments, the context determination component 162 may maintain two embedding matrices: a dialog action embedding matrix $A \in \mathbb{R}^{|A| \times d}$ and a dialog slot embedding matrix $S \in \mathbb{R}^{|S| \times d}$, where $|A|$ and $|S|$ refer to the number of dialog actions and slots in the model, respectively. By projecting each action $a_t$ and slot $s_t$ in the action-slot pair $(a_t, s_t) \in D^t$ via A and S, their corresponding embeddings $a_t$, $s_t$ are obtained.

With each $(a_i, s_i) \in D$, an output action embedding $a_i$ and slot embedding $s_i$ are obtained from the embedding matrices. An element-wise addition to fuse $a_i$ and $s_i$ may be performed, then the fused embedding of $a_i$ $s_i$ may be transformed by a linear transformation with a ReLu activation to obtain oi as follows:

$$o_i = \text{ReLU}(W_o(a_i + s_i) + b_o) \quad \text{Equation (1)}$$

For all $|D^t|$ action-slot pairs in $D^t$, the corresponding fused embeddings $\{o_1, o_2, \ldots, o_{l_D}\}$ are obtained by following the same process that produces oi in Eq. (1). To obtain the output embeddings, row-wise concatenation across the fused embeddings is performed as below.

$$o^t = o_1 \oplus o_2 \oplus \ldots \oplus o_{l_D} \quad \text{Equation (2)}$$

The previous user input encoder 164b may receive as input a list of previous user input transcripts $U^t = \{u_1, u_2, \ldots, u_{t-1}\}$. To learn the contextually semantic embeddings of an user input transcript $u_j \in U^t$, the pre-trained uncased Bert-base language model may be used. Specifically, each $u_j$ may be tokenized with the Bert-base tokenizer. Next, a [CLS] token is prepended and a [SEP] token is appended to the tokenized transcript. Since utterances at different turns have a different number of previous utterance transcripts, $l_U$ is used as the maximum number of turns in all the training examples. At turn t-th ($t<l_U$), $l_U-t$ empty transcripts are padded to obtain a length of $l_U$. During inference, if an utterance has more than $l_U$ turns, only the latest $l_U$ previous user inputs may be considered.

Each $u_j \in U^t$ is inputted into the pre-trained Bert-base model and to extract the embeddings from the [CLS] token as the summarized embeddings for $u_j$. For all previous user input transcripts in $U^t$, the corresponding output embeddings $\{u_1, u_2, \ldots, u_{l_U}\}$ are obtained. The padded empty transcripts are masked as zero embeddings so that they have no effect on model performance. A row-wise concatenation for all previous user input transcripts' embeddings $\{u_1, u_2, \ldots, u_{l_U}\}$ is performed as follows:

$$U^t = u_1 \oplus u_2 \oplus \ldots \oplus u_{l_U} \quad \text{Equation (3)}$$

Figure 5B:
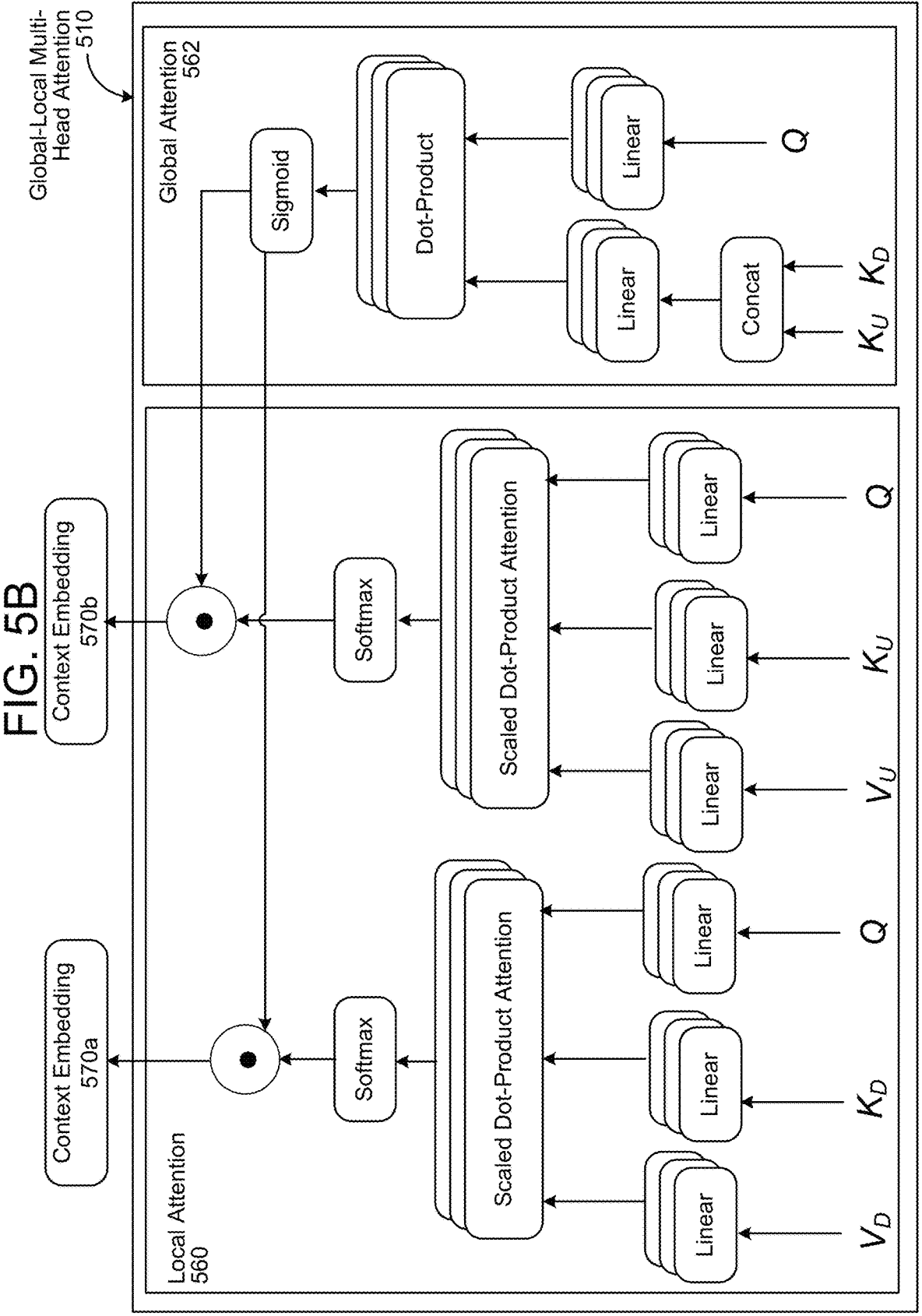
FIG. 5B is a conceptual diagram illustrating an example global-local multi-head attention component for use with a NLU component, according to embodiments of the present disclosure.

FIG. 5B shows an example architecture of the global-local multi-head attention component 510. Multi-head attentions are used to measure local and global attention scores and fuse them using a dot product. $O^t$ (from Equation (2) above) is a row wise concatenation of all dialog act embeddings, $U^1$ is a row-wise concatenation of all previous user inputs transcript embeddings, and $P^t = \{p_1, p_2, \ldots, p_n\}$ is the wordpiece embeddings. Considering $P^t$ as the Query, a scale dot attention is applied to measure the local attention scores au between $O^t$ and $P^t$, and the local attention scores au between $U^t$ and $P^t$ as following:

$$\alpha_D = \text{softmx}\left(\frac{Q_D K_D^T}{\sqrt{d}}\right); \alpha_U = \text{softmx}\left(\frac{Q_U K_U^T}{\sqrt{d}}\right) \quad \text{Equation (4)}$$

where $Q_D$, $K_D$ and $V_D$ are learned by linearly transforming the corresponding $O^t$ and $P^t$. $Q_U$, $K_U$ and $V_U$ are learned by linearly transforming the corresponding $P^t$ and $U^t$.

$$Q_D = W_D^{(q)} P^t + b_D^{(q)}; K_D = W_D^{(k)} O^t + b_D^{(k)}; V_D = W_D^{(u)} O^t + b_D^{(u)} \quad \text{Equation (5a)}$$

$$Q_U = W_U^{(q)} P^t + b_U^{(q)}; K_U = W_U^{(k)} O^t + b_U^{(k)}; V_U = W_U^{(u)} O^t + b_U^{(u)} \quad \text{Equation (5b)}$$

For measuring global attention scores, first perform a column-wise concatenation between $O^t$ and $U^t$ is performed, resulting in a long context vector $C^t \in \mathbb{R}^{1 \times (l_D \times d + l_U \times 768)}$ (where d is the dialog act embedding size and 768 is the Bert-base embedding size). Then, the global attention scores are measured as following:

$$\beta = \text{sigmoid}(Q_\beta K_\beta^T) \quad \text{Equation (6)}$$

where $Q_\beta$, $K_\beta$ are learned by linearly transforming $P^t$ and $C^t$.

$$Q_\beta = W_\beta^{(q)} P^t + b_\beta^{(q)}; K_\beta = W_\beta^{(k)} C^t + b_\beta^{(k)} \quad \text{Equation (7)}$$

Note that $\beta$ is a n×1 matrix, where each entry in $\beta_i \in \beta$ shows how much all the context information contribute to each subquery $p_i \in P^t$. Thus, $\beta$ is replicated to have a similar dimension size with $\alpha_D$ and $\alpha_U$, resulting in $\beta_D$ and $\beta_U$ respectively. Then, an element-wise product between $\alpha_D$ and $\beta$, as well as au versus $\beta$ is performed:

$$\gamma_D = \alpha_D \odot \beta_D; \gamma_D = \alpha_D \odot \beta_U \quad \text{Equation (8)}$$

Lastly, a matrix multiplication between $V_D$ and $\gamma_D$ is performed to obtain attentive dialog act embeddings $C_{D,att}^t \in \mathcal{R}^{n \times d}$ and between $V_U$ and $\gamma_U$ to obtain attentive previous utterance transcript embeddings $C_{U,att}^t \in \mathcal{R}^{n \times 768}$. Then column-wise concatenation of $C_{D,att}^t$ and $C_{U,att}^t$ with wordpiece embeddings $P^t$ is performed $$C_{D,att}^t = \gamma_D V_D; C_{U,att}^t = \gamma_U V_U$$

$$P_{context}^t = [P^t, C_{D,att}^t, C_{U,att}^t] \quad \text{Equation (9)}$$

With $P^t$ context embedding 570a, 570b established, $P^t$ context embedding 570 is processed through the stacked 2-layer bidirectional BiLSTM (forwards LSTMs 520, backward LSTMs 522) to produce a series of context-aware hidden states $H_t^{slot} = \{h_1^{(slot)}, h_2^{(slot)}, \ldots, h_n^{(slot)}\}$ and a summarized bidirectional embedding vector $h^{(int)}$.

$$\overrightarrow{h_i} = \overrightarrow{LSTM}\left(p_i^{(context)}, \overrightarrow{h_{i-1}}\right), \text{with } i \in [1, n],$$

$$\overleftarrow{h_i} = \overleftarrow{LSTM}\left(p_i^{(context)}, \overleftarrow{h_{i+1}}\right), \text{with } i \in [1, n],$$

$$h_i^{slot} = \left[\overrightarrow{h_i}, \overleftarrow{h_i}\right], h^{(int)} = \left[\overrightarrow{h_n}, \overleftarrow{h_1}\right] \quad \text{Equation (10)}$$

The intent prediction component 530 may implement a multi-class classification problem, where $h_{intent}$ in Eq. (10) is used to produce an intent distribution over all |I| intents at each input utterance $u_t$. The cross entropy loss for $u_t$ is defined as the following:

$$\hat{y}_{t,1}^{(int)} = \text{softmax}\left(W^{(int)} h_{(int)} + b_{(int)}\right) \quad \text{Equation (11)}$$

$$L_{ic} = \sum_{j=1}^{|I|} y_{t,j}^{(int)} \log \hat{y}_{t,j,I}^{(int)}$$

The entity prediction component 535 may take as input a combination of the outputs of the forward LSTMs 520 and the backward LSTMs 522, which may be combined by a combine component 525. The entity prediction component 535 may use $H_t^{slot}$ (Eq. 10) for slot filling task for $u_t$ with |S| slots over each of n tokens at each input utterance using the following cross entropy loss:

$$\hat{y}_{t,i,S}^{(slot)} = \text{softmax}\left(W^{(slot)} h_i^{(slot)} + b^{(slot)}\right) \quad \text{Equation (12)}$$

$$L_{sf} = \sum_{i=1}^{n} \sum_{k=1}^{|S|} y_{t,i,k,S}^{(slot)} \log \hat{y}_{t,i,k,S}^{(slot)}$$

The NLU component 160 may employ a multi-task learning strategy to train the model.

The final joint cost function may be defined as:

$$L = \lambda_1 L_{ic} + \lambda_2 L_{sf} \quad \text{Equation (13)}$$

Although the FIG. 5A illustrates two context encoders 164a, 164b for encoding system responses and previous user inputs for previous dialog turns of a session, it should be understood that other additional context encoders 164 may also be used to encode other types of context data. For example, another context encoder may be used to encode user context data, another context encoder may be used to encode device context data, yet another context encoder may be used to encode user preferences, another context encoder may be used to encoder user profile data, another context encoder may be used to encode device location and user location, and so on. The different encoded context data may be processed by the global-local multi-head attention component 510 in a similar manner as described above in relation to the dialog act context data and the previous user input context data. The different encoded context data may be incorporated in processing performed by the NLU component 160 as described above, in a manner similar to how the dialog act embeddings and the previous user input embeddings are incorporated.

FIG. 6A is a conceptual diagram of another embodiment of the system 120, described above in relation to FIG. 1. In this embodiment, the system 120 includes a SLU component 140 instead of (or in addition to) the ASR component 150 and the NLU component 160. The SLU component 140 may be configured to process audio data representing a spoken input and determine NLU data corresponding to the spoken input.

Steps 1 to 7 shown in FIG. 6A may be similar to the steps 1 to 7 described above in relation to FIG. 1. The user 105 may provide an input in a similar manner described above in relation to FIG. 1, and the device 110 may send (step 1) audio data and/or other type of input data to the system 120. The context determination component 162 may determine relevant context embedding(s) 167, which is stored at the context cache 168, in a manner similar to that described above in relation to FIG. 1.

The orchestrator component 130 may send (step 28) the audio data corresponding to the spoken input to the SLU component 140 for processing. The orchestrator component 130 may also send (step 29) the stored relevant context embedding(s) 167 from the context cache 168. The SLU component 140 may process the audio data and the relevant context embedding(s) 167 to determine NLU data (e.g., intent data, entity data, domain, one or more NLU hypotheses including an intent, one or more entities and corresponding confidence scores, etc.) corresponding to the words spoken by the user 105. The SLU component 140 may use the context data to apply "attention" to portions of the audio data to determine NLU data that may be more accurate. The SLU component 140 may use one or more attention mechanisms configured to enhance important parts of the audio data based on the context data, so that the SLU component 140 selectively concentrates on that particular part of the audio data and devotes more computing power to that particular part of the audio data.

In some embodiments, the SLU component 140 may include a combiner component 142 configured to combine the relevant context embedding(s) 167 and audio embeddings corresponding to the audio data. In some embodiments, the orchestrator component 130 may send the audio embeddings outputted by the acoustic encoder 163 to the SLU component 140. In some embodiments, the acoustic encoder 163 may be implemented outside of the context determination component 162, and the output of which may be used by one or more of the components shown in FIG. 1. In some embodiments, the combiner 142 may concatenate the audio embeddings and the relevant context embedding(s) 167. In other embodiments, the combiner 142 may perform an element-wise addition of the audio embeddings and the relevant context embedding(s) 167. In yet other embodiments, the combiner component 142 may combine the audio embeddings and the relevant context embedding(s) 167 using an attention mechanism.

The SLU component 140 may be equivalent to a combination of the ASR component 150 and the NLU component 160. Yet, the SLU component may process audio data and directly determine the NLU data, without an intermediate step of generating ASR output data. As such, the SLU component 140 may take audio data representing a spoken natural language input and attempt to make a semantic interpretation of the spoken natural language input. That is, the SLU component 140 may determine a meaning associated with the spoken natural language input and then implement that meaning. For example, the SLU component 140 may interpret audio data representing a spoken natural language input in order to derive a desired action. The SLU component 140 may output a most likely NLU hypothesis, or multiple NLU hypotheses associated with respective confidence or other scores (such as probability scores, etc.). Details on how an example SLU component 140 may process are described below in relation to FIG. 6A.

The SLU component 140 may send (step 30) the NLU data to the orchestrator component 130. The orchestrator component 130 may send data to one or more other components, such as, the skill component 190, the TTS component 180, the user recognition component 195, the profile storage 170, etc. as described above in relation to FIG. 1. The orchestrator component 130 may send (step 31) output data and/or output audio data to the device 110 in a similar manner described above in relation to step 14 shown in FIG. 1.

Figure 6B:
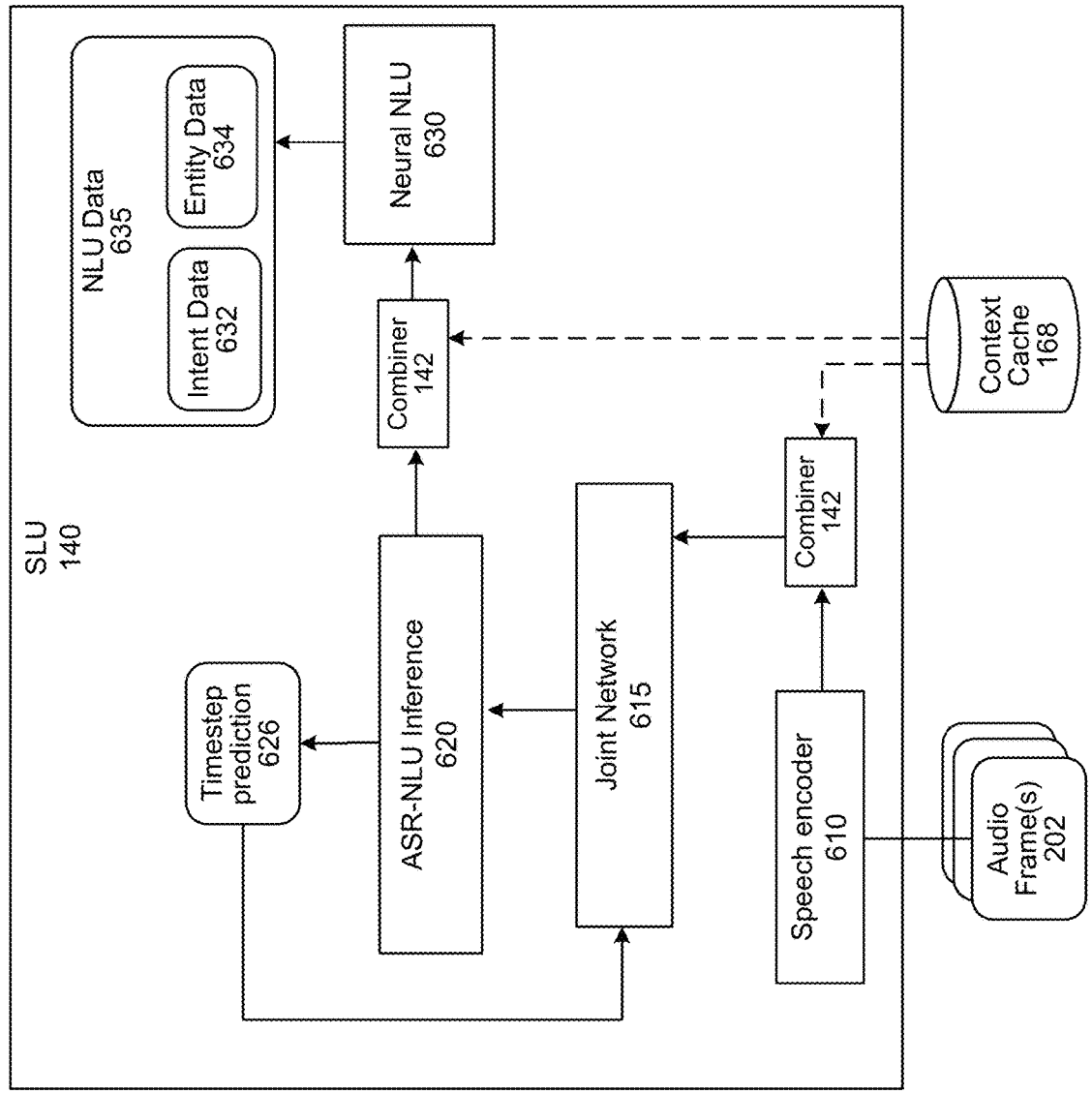
FIG. 6B is a conceptual diagram illustrating an example SLU component integrating context data during processing, according to embodiments of the present disclosure.

FIG. 6B is a conceptual diagram showing example components of the SLU component 140 according to an example embodiment. In addition to the combiner component 142, the SLU component 140 may also include a joint network 615, an ASR-NLU inference component 620, and a neural NLU component 630.

The SLU component 140 may perform end-to-end (E2E) speech processing, meaning the SLU component 140 may be configured to receive input audio data related to an utterance and process the input audio data to predict intents and slots and/or other NLU data. Thus, E2E SLU component 140 may aim to infer intents and slots from spoken audio via a single neural network. For example, when a user says order some apples, the model maps this spoken utterance (in the form of audio) to the intent "Shopping" and entities/slots such as {Apple: Item}.

To improve E2E SLU processing, the system 100 may be configured to incorporate dialog history and/or other context data in multi-turn and task-oriented dialogs. Offered is a context E2E SLU model architecture that uses a multi-head attention mechanism over context data, for example, encoded previous utterances and dialog acts (actions taken by the voice assistant system 120) of a multi-turn dialog. In example embodiments, the SLU component 140 may use the combiner component 142 to combine audio embeddings outputted by the speech encoder 610 with the relevant context embeddings 167 stored in the context cache 168. In other example embodiments, the SLU component may use the combiner component 142 to combine an output of the ASR-NLU inference component 620 with with the relevant context embeddings 167 stored in the context cache 168. The system 100 may include alternative methods to integrate these contexts into the recurrent and transformer-based models.

Figure 6C:
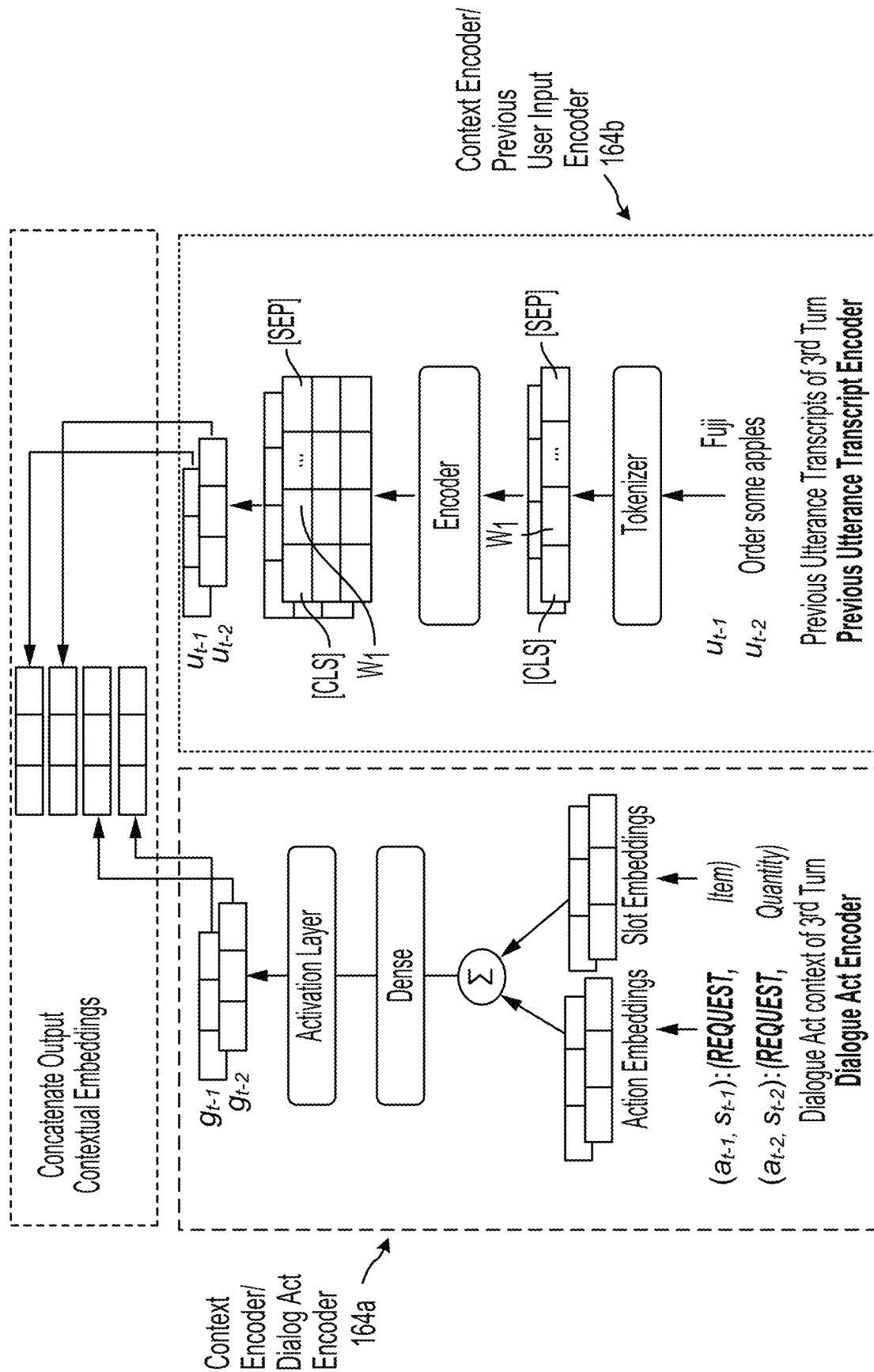
FIG. 6C is a conceptual diagram illustrating example context encoders, according to embodiments of the present disclosure.
Figure 6D:
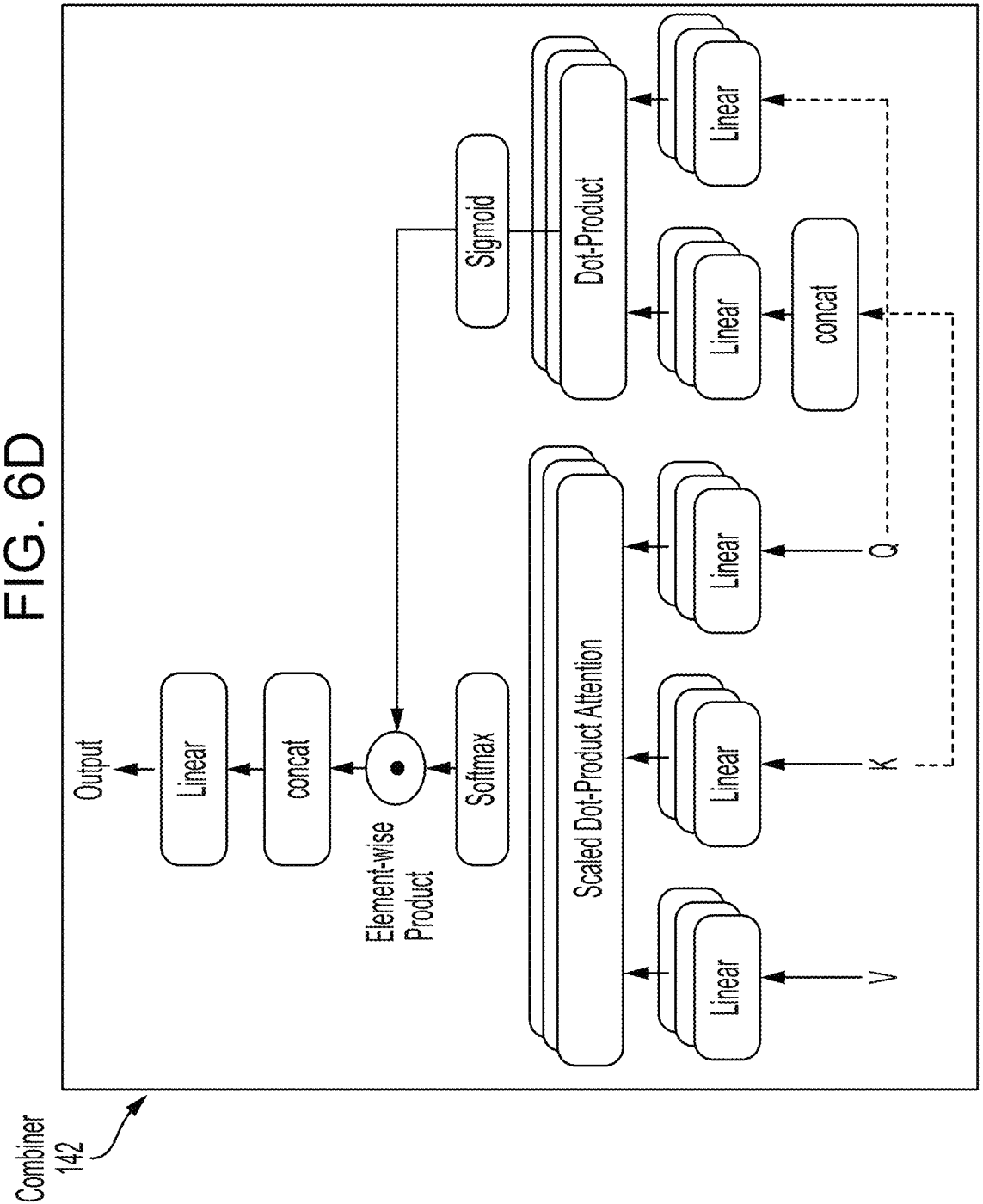
FIG. 6D is a conceptual diagram illustrating an example gate model, according to embodiments of the present disclosure.

In an example embodiment, one approach to encode dialog history in a multi-turn E2E SLU system is illustrated in FIGS. 6C-6D. In contrast to other systems, where dialog acts are encoded singularly for ASR or NLU, the system of the present disclosure may encode both dialog acts and previous utterances to improve an E2E SLU architecture. Specifically, a multi-head gated attention mechanism may be used to encode dialog contexts. The attention-based context can be integrated at different layers of a neural E2E SLU model. The operation may use variants where either the audio frames, the neural interface layer (from ASR to NLU), or both are supplemented by the attention-based context vectors. Furthermore, the learnable gating mechanism in a multi-head gated attention can downscale the contribution of the context when needed. The present disclosure approach improves the performance of the state-of-the-art E2E SLU models—namely recurrent neural network transducer SLU and transformer transducer SLU on both internal industrial voice assistant datasets and publicly available ones.

The problem of a multi-turn E2E SLU may be formulated as follows: in a multi-turn setting, a dialog between the user 105 and the system 120 has T turns. Each turn $t \in [1, T]$ extends a growing list of dialog acts $\mathcal{F}^t = \{(a_1, s_1), \ldots, (a_{t-1}, s_{t-1})\}$ corresponding to the preceding system responses and a list of the user's previous utterance transcripts $\mathcal{U}^t = \{u_1, u_2, \ldots, u_{t-1}\}$. Each dialog act $(a_j, s_j)$ in $\mathcal{F}^t$ comprises a dialog action $a_j$ from an action set $\mathcal{A}$ and a dialog slot $s_j$ from a slot set $\mathcal{S}$. Taking the above example dialog, the second turn may be: the previous utterance $u_2$=Fuji, the dialog action $a_2$=REQUEST and the dialog slot $s_2$=Item.

The inputs of each turn t include acoustic input and dialog contexts. The acoustic input $X^t$ comprises a sequence of n frame-based acoustic frames $X^t = \{x_1^t, x_2^t, \ldots, x_n^t\}$. Dialog contexts include preceding dialog acts $F^t$, and the previous utterance transcripts $\mathcal{U}^t$. One goal is to build a context neural E2E SLU architecture that correctly generates transcription and semantic outputs for each spoken turn, namely intent $y^{int}$, transcript tokens $\{y^{tok.}\}$, and slot sequence (one per token) $\{y^{slot}\}$.

The example SLU component 140, shown in FIG. 6B, may include an E2E SLU architecture/model, consisting of ASR and neural NLU modules jointly trained via a differentiable neural interface. The SLU component 140 may receive context data from the context cache 168, where the stored context data may be determined as described herein by the context determination component 162. The context data at the context cache 168 may be stored as context embedding data.

In some embodiments, the context determination component 162 may determine context data as described below in relation to FIG. 6C, where the context determination component 162 may convert dialog acts (system responses) and utterance transcriptions (user inputs) of previous dialog turns into context embeddings.

The SLU component 140 may combine the context embeddings with input audio features $X^t = \{x_1^t, x_2^t, \ldots, x_n^t\}$ and then processed by an ASR model to obtain the output sequence $y = \{y_1^{tok.}, \ldots, y_m^{tok.}\}$, where the outputs $y_i^{tok.}$ are transcription graphemes, word or subword units. In some embodiments, one or more components of the context determination component 162 may be trained along with the rest of the E2E SLU architecture shown in FIG. 6B. The hidden interface (e.g., the ASR-NLU inference component 620) may be connected to the speech encoder via the joint network 615, which may be a feedforward neural network that combines the audio frames 202 with the prediction data 626. The ASR-NLU inference 620 passes the intermediate hidden representation sequence $H^t = \{h_1^t, h_2^t, \ldots, h_m^t\}$ to the neural NLU component 630 that predicts intents $y^{int.}$ and a sequence of predicted entities/slots, one per token, $\{y^{slot}\}$. One training objective is to minimize E2E SLU loss: $\mathcal{L}_{total} = \lambda_1 \mathcal{L}_{tok.} + \lambda_3 \mathcal{L}_{slot.} + \lambda_3 \mathcal{L}_{int.}$, where $\mathcal{L}_{tok.}$ is the loss for intent prediction.

Below follows a description of an example context encoder, that may be implemented by the context determination component 162, and various approaches to encode dialog acts and previous utterance transcripts. FIG. 6C shows an example processing performed by the context determination component 162. In some embodiments, the context determination component 162 may include a dialog act encoder 164a, which may be one of the context encoders 164 shown in FIGS. 1 and 6A. The dialog act encoder 164a may encode dialog acts corresponding to system responses outputted/determined by the system 120 during a prior dialog turn. The context determination component 162 may also include a previous user input encoder 164b, which may be another one of the context encoders 164 shown in FIGS. 1 and 6A. The previous user input encoder 164b may encode ASR data/transcripts corresponding to previous utterances received during prior turns of the dialog.

Referring to the dialog act encoder 164a, for the t-th turn, a list of dialog acts for all previous turns denoted by $F^t = \{(a_1, s_1), \ldots, (a_{t-1}, s_{t-1})\}$ is provided as the input. The maximum number of dialog action entity pairs is defined as $l_a$. If $F^t$ has fewer than $l_a$ dialog action-entity pairs, it may be filled to length $l_a$ with a default action and entity. The embedding layer maintains two embedding matrices, a dialog action embedding matrix $M^{\mathcal{A}} \in \mathbb{R}^{|\mathcal{A}| \times d}$, and a dialog entity embedding matrix $M^{\mathcal{S}} \in \mathbb{R}^{|\mathcal{S}| \times d}$ with $|\mathcal{A}|$ and $|\mathcal{S}|$ referring to the total number of unique dialog actions and entity types in the system, respectively. By passing each dialog action $a_j$ and dialog slot $s_j$ through their respective embedding matrices, their corresponding embeddings $a_j$ and $s_j$ are obtained.

Given the dialog action and entity embeddings, $a_j$ and $s_j$, the embeddings are fused via an element-wise addition followed by a nonlinear transformation with an activation layer (e.g., ReLU) as summarized below:

$$g_j = \text{ReLU}(W^g(a_j + s_j))$$  Equation (14)

The output $G^t$ is produced as a stack of dialog act embeddings by aggregation of the list of $g_{t-l_a}, \ldots g_{t-1}$.

For the input to the previous user input encoder 164b, a list of previous user inputs in the dialog is denoted by $\mathcal{U}^t = \{u_1, u_2, \ldots, u_{t-1}\}$. For each previous user input $u_k$, the context determination component 162 tokenizes it using the tokenizer (e.g., pre-trained BERT-base). Next, the context determination component 162 may prepend a [CLS] token and append a [SEP] token to the tokenized transcript. The context determination component 162 may set the maximum number of previous user inputs to $l_b$. If $\mathcal{U}^t$ has a length less than $l_b$ the context determination component 162 may fill it with empty sequences. If $u^t$ has a length greater than $l_b$ the context determination component 162 may take the $l_b$ latest sequences in $\mathcal{U}^t$. For the encoding layer, from the tokenized transcripts, the context determination component 162 applies an encoder (e.g., a pre-trained BERT model or another type of neural network) to obtain an user input embedding $u_k$ for each previous user input $u_k$ where the context determination component 162 uses the [CLS] token embedding as the summarized embedding for a full utterance transcript. For the output, similar to $G^t$, the context determination component 162 outputs $U^t$ by stacking the list of utterance embeddings $u_{t-l_b}, \ldots, u_{t-1}$ from previous turns.

The context determination component 162 may combine the context encodings $G^t$ and $U$ to create final context vectors that may be fed into the SLU component 140. The context encodings may be combined in three different ways: (i) averaged context carryover, (ii) attentive context carryover, and (iii) gated attentive context carryover. To illustrate, described are the approaches with an example that combines dialog act encodings $G^t$ and the previous user input encodings $U$ with the acoustic embeddings $X^t = \{x_1^t, x_2^t, \ldots, x_n^t\}$ of the t-th turn. The same process may also be applied to combine context embeddings at different points in the model.

As noted above, $G^t$ is the stack of dialog act context embeddings and $U^t$ is previous user input embeddings at turn t. For averaged context carryover, the context determination component 162 computes the average embeddings of all dialog act context embeddings $g_j \in G^t$ and average encodings of all previous user input embeddings $u_k \in U^t$. The context determination component 162 combines the average context embeddings with the input by concatenating them with the acoustic embeddings $\{x_1^t, x_2^t, \ldots, x_n^t\}$ for each acoustic time step as follows:

$$\bar{g}^t = \frac{1}{l_a} \sum\nolimits_{g_j \in G^t} g_j \quad \bar{u}^t = \frac{1}{l_b} \sum\nolimits_{u_k \in U^t} u_k$$  Equation (15)

$$c^t = [\bar{g}^t; \bar{u}^t]$$

$$\{x_1^{t'}, \ldots x_n^{t'}\} = \{[x_1^t; c^t], \ldots, [x_n^t; c^t]\}$$

For attentive context carryover averaging context embeddings of the previous turns may hamper the ability of the model to access fine-grained context information for a specific turn and time step. Therefore, the context determination component 162 may utilize the multi-head attention mechanism, illustrated in FIG. 6D and implemented by the combiner component 142 in some embodiments, which uses acoustic embeddings, of each time step, to attend to relevant dialog contexts and create the final context embeddings.

Specifically, the combiner component 142 uses queries, keys, and values $Q_i$, $K_i$, $V_i$, $i \in \{g, u\}$ via linear projections as follows:

$$Q_g = W_g^{(q)} X^t; K_g = W_g^{(k)} G^t; V_g = W_g^{(v)} G^t$$

$$Q_u = W_u^{(q)} X^t; K_u = W_u^{(k)} U^t; V_u = W_u^{(v)} U^t \quad \text{Equation (16)}$$

Here $X^t$, $G^t$, $U^t$ are acoustic, dialog act, and previous user input embeddings for the t-th turn, respectively. Matrices $W_g^{(\cdot)}$, $W_u^{(\cdot)}$ are learned linear projections. A scaled dot-product attention is then used to calculate the final dialog act and user input context vectors through the weighted sum of projected context embeddings of the previous turns. This process is formulated as:

$$\alpha_g = \text{Softmax}\left(\frac{Q_g K_g^T}{\sqrt{d}}\right), \quad C_g^t = \alpha_g V_g \quad \text{Equation (17)}$$

$$\alpha_u = \text{Softmax}\left(\frac{Q_u K_u^T}{\sqrt{d}}\right), \quad C_u^t = \alpha_u V_u$$

where d is the hidden size of the attention layer applied for numerical stability. The attention components $C_g^t$ and $C_u^t$ are then concatenated with the acoustic embeddings $X^t$ provided as input.

For context gated attentive context carryover, one limitation of the attention mechanism is that it cannot downscale the contribution of a context when needed. Take a two-turn dialog as an example: A user asks a voice assistant to call uncle sam in the first turn, and the system confirms back to see if the user wants to call Uncle Sam's Sandwich Bar (associated dialog act is REQUEST(restaurant)). Then, in the second turn, the user corrects that she wants to "call my uncle sam". In this case, applying multi-head attention as described in Equations (16)-(17) on the previous turn utterance call uncle sam, $U^t$, and dialog act REQUEST(restaurant), $G^t$, may lead to a wrong interpretation for the second turn. This is because the results of the Softmax function in Equation (4) assigns dialog act context to positive scores, misleadingly associating uncle sam with a restaurant name rather than a person name.

To address such issues, the combiner component 142 may employ a gate mechanism (which may be part of the gate model 165 shown in FIG. 6A) to control information flow or integrate different types of information, that includes a learnable gating mechanism on top of the multi-head attentive context carryover to further reduce a context's influence when it does not help the interpretation. Specifically, the gate model 165 may concatenate all the context embeddings in $G^t$ and U to obtain $C_c^t$. Then, the gate model 165 obtains context scores 166 by computing the similarity between the linearly projected $X^t$ and $C_c^t$, as follows:

$$\beta_c = \text{sigmoid}(Q_c K_c^T),$$

$$Q_c = W_c^{(q)} X^t; K_c = W_c^{(k)} X_c^t \quad \text{Equation (18)}$$

where $W_c^{(q)}$ and $W_c^{(k)}$ are learnable parameters. $\beta_c \in \mathbb{R}^{n \times 1}$ and n is the number of frames. Each entry $\beta_c$ shows how much contexts contribute to the acoustic embedding $x_i^t$ at i-th frame $i \in [1, n]$. The system replicates $\beta_c$ so that it has the same dimensions as $\alpha_g$ and $\alpha_u$. The gated attention/context scores 166 (represented as $\gamma$) are then computed by the element-wise product between a scores and $\beta_c$:

$$\gamma_g = \alpha_g \odot \beta_c; \gamma_u = \alpha_u \odot \beta_c \quad \text{Equation (19)}$$

The gate model 165 computes the gated attentive context embeddings across each attention head, as follows:

$$C_{g,gated}^t = \gamma_g V_g; C_{u,gated}^t = \upsilon_u V_u. \quad \text{Equation (20)}$$

Finally, $C_{g,gated}^t$ and $C_{u,gated}^t$ are row-wise concatenated with the acoustic embeddings $X^t$ as input.

Although the figures illustrate two context encoders 164a, 164b for encoding system responses and previous user inputs for previous dialog turns of a session, it should be understood that other additional context encoders 164 may also be used to encode other types of context data. For example, another context encoder may be used to encode user context data, another context encoder may be used to encode device context data, yet another context encoder may be used to encode user preferences, another context encoder may be used to encoder user profile data, another context encoder may be used to encode device location and user location, and so on. The different encoded context data may be combined in a similar manner as described above in relation to the dialog act context data and the previous user input context data. The different encoded context data may be incorporated in processing performed by the SLU component 140 as described below, in a manner similar to how the dialog act embeddings and the previous user input embeddings are incorporated.

The SLU component 140 may support various context ingestion scenarios. For example, the SLU component 140 may integrate the context data using three schemes: ingestion by the speech encoder 610, ingestion by the hidden ASR-NLU inference component 620, or ingestion at both of these points. In the embodiment where the context data is ingested by the speech encoder 610, the SLU component 140 may incorporate the outputted context embeddings only into the acoustic embeddings for an ASR task. In this approach, the context data benefits the speech encoder 610 more than the prediction network of the ASR transducer models. To combine context with acoustic embeddings, the gate model 165 (or another component of the system 100) inputs the acoustic embeddings $X^t = \{x_1^t, x_2^t, \ldots, x_n^t\}$ as the query, and the context encodings $G^t$ and $U^t$ serve as the keys and values in the context combiner 142. The output $\{x_1^{t'}, \ldots, x_n^{t'}\}$ with ingested context (Equation 15) are then used to perform the ASR task by the ASR-NLU inference component 620.

In the embodiment where the ASR-NLU inference component 620 ingests context data, the system ingests the output context embeddings only into the ASR-NLU interface embeddings for the SLU task. As such, the SLU component 140 may use the ASR-NLU inference embeddings $H^t = \{h_1^t, h_2^t, \ldots, h_m^t\}$ as queries for the context combiner 142 instead of the acoustic embeddings.

In the embodiment where the context data is ingested by both the speech encoder 610 and the ASR-NLU inference component 620, the system may maintain a shared context encoder between the ASR-NLU inference component 620 and the neural NLU component 630, resulting in a shared $G^t$ and $U^t$ between them. For fusion, the SLU component 140 may maintain two separate context combiners to increase the context ingestion flexibility. Specifically, the SLU component 140 establishes a gated multi-head attentive context combiner for the ASR-NLU inference component 620 with $X^t$ as queries, while having another gated multi-head attentive context combiner for the neural NLU component 630 with $H^t$ as queries.

In some embodiments, the SLU component 140 may take as input audio frames 202 corresponding to input audio data representing a spoken input from the user 105. The SLU component 140 may determine input audio features corresponding to individual audio frames 202. In example embodiments, the input audio features may be 64-dimensional LFBE features extracted every 10 ms with a window size of 25 ms from the input audio data. The input audio features of each audio frame 205 may be stacked with the features of two previously occurring audio frames of the input audio data, followed by a downsampling factor of 3 to achieve a low frame rate, resulting in 192 feature dimensions per audio frame. In some embodiments, the SLU component 140 may use a token set with 4,000 wordpieces trained by a sentencepiece tokenization model.

In some embodiments, the SLU component 140 may employ Recurrent Neural Network Transducer (RNN-T) based models for the ASR-NLU inference component 620 and the neural NLU component 630. In other embodiments, the SLU component 140 may employ Transformer Transducer (T-T) based models for the ASR-NLU inference component 620 and the neural NLU component 630. The speech encoder 610 may be an audio encoder network that encodes LFBE features. The ASR-NLU inference component 620 may be a prediction network that encodes a sequence of predicted wordpieces. The joint network 615 may combine the speech encoder output and the timestep prediction data 626. The neural NLU component 630 may predict the NLU data 635 including the intent data 632 and the entity data 634. In some embodiments, the neural NLU component 630 may contain two feedforward layers before projecting into the number of intents. The neural NLU component 630 may directly take the output embeddings and project them into the entity size. One or more components of the SLU component 140 may be transformer layers, LSTM layers, bi-directional LSTM layers, and the like.

One or more machine learning training techniques may be used to configure the SLU component 140. In some embodiments, a stage-wise joint training strategy may be used. In an example embodiment, an ASR model may be first pre-trained to minimize the RNN-T model based loss. Then the pre-trained ASR model may be frozen (e.g., weights and parameters stored for the model and not changed/updated) to train the neural NLU model to minimize the cross entropy losses for the intent and entity predictions. During training, the training dataset may include all subwords of a word tagged with its corresponding entity. During inference/runtime, the subwords may be combined to form the word, and the entity tag for the last subword may be determined as the entity tag for the word. Lastly, the ASR and NLU models may be jointly finetuned to minimize all three losses. In some embodiments, the training techniques may involve supervised learning where the training data includes manually-annotated transcripts/text data of sample dialog turns.

Figure 7A:
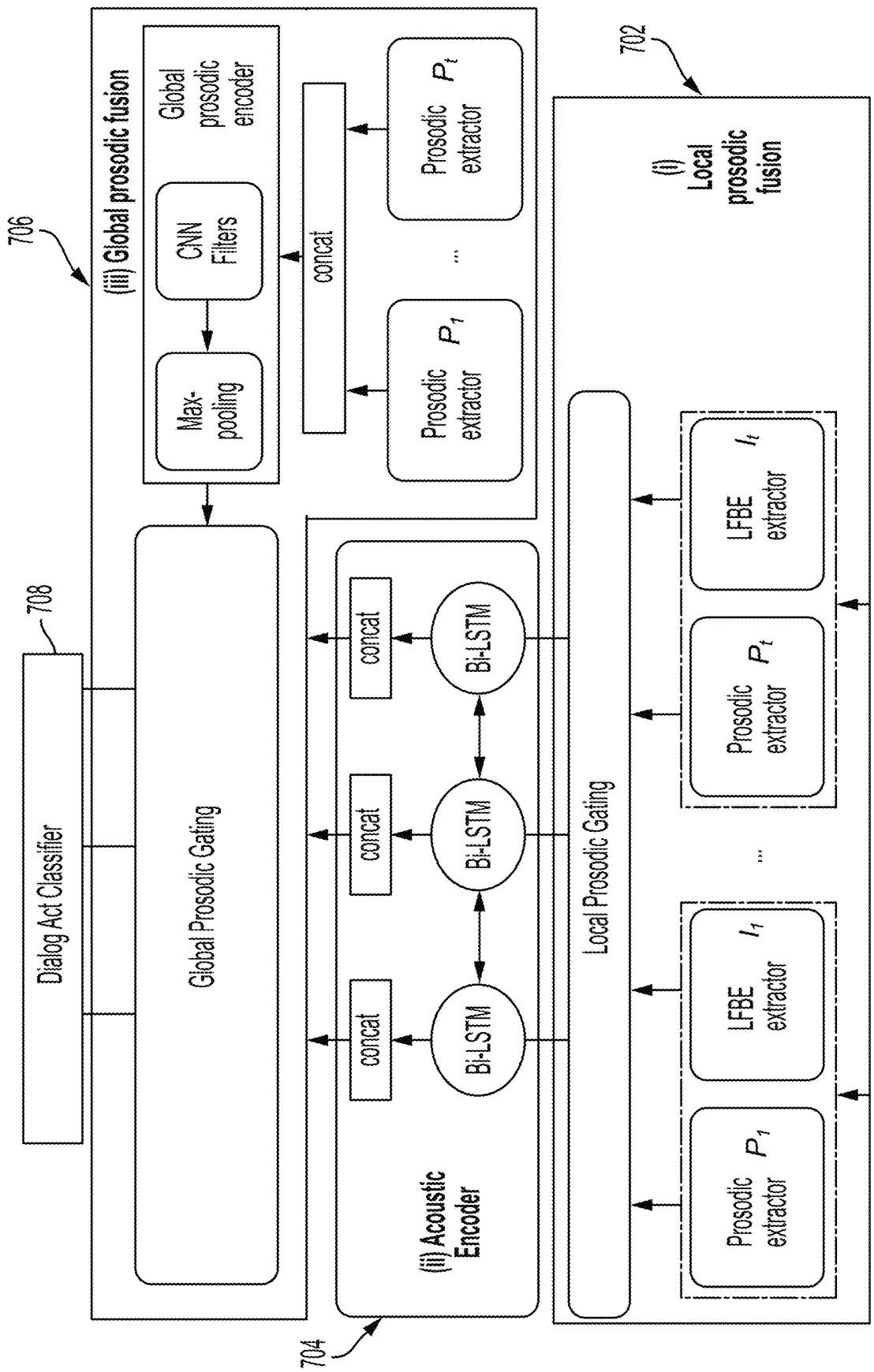
FIG. 7A is a conceptual diagram illustrating example processing for integrating prosodic context information in dialog processing, according to embodiments of the present disclosure.

FIG. 7A illustrates an example embodiment where prosodic context information is used for classifying a dialog act/system response. Prosody comprises the intonation, rhythm, and stress of spoken language. Prosody may represent the non-lexical channel that serves a fundamental role in speech communication among humans. It captures the complex linguistic and semantic contents embedded in spoken language beyond words and their literal meanings. At the syllable/word level, stressing on different syllables of a word can lead to different meanings (e.g., REcord vs. reCORD). At the sentence level, overall intentional contour contributes to characterize speaker's intention and communicative meanings (e.g., agreement vs. backchannel: yes vs. yes?).

FIG. 7A illustrates an example embodiment of an E2E neural architecture for dialog act classification that takes into account prosodic features occurring at different levels in an utterance. Part of this architecture is a learnable gating mechanism that assesses the importance of prosodic features and selectively retains core features necessary for E2E dialog act classification.

The dialog act classification task may be represented as follows: The input is a sequence of raw audio with t time frames, $X=\{x_1, x_2, \ldots, x_t\}$. Each $x_t$ is converted to the logarithm of mel-scale filter bank energy (LFBE) features $L=\{l_1, l_2, \ldots, l_n\}$ and prosodic features $P=\{(e_1, c_1), \ldots, (e_t, c_t)\}$, where $e_i \in \mathcal{R}^{|e_i|}$ and $c_i \in \mathcal{R}^{|e_i|}$ denote energy and pitch features, respectively. The goal is to correctly classify dialog actions for each audio input X, namely $\{y^{diag}\}$. As shown in FIG. 7A, an example architecture may include a local prosodic infusion component 702, an acoustic encoder 704, a global prosodic infusion component 706, and a dialog act classifier 708. The local prosodic infusion component 702 may encode prosodic features and infuse them with the LFBE features via a local prosodic fusion 702 shown in FIG. 7B.

At least two types of prosodic features—energy and pitch are extracted. The description and figures focus on energy and pitch features, however, it should be understood that other prosodic features may also be extracted and used in a similar manner as described herein.

For each audio frame $x_i \in X$, the 3-dimensional energy features $e_i$ are computed from the 40-mel frequency filterbank. These features may be (i) the log of total energy normalized by dividing by the maximum total energy of the utterance, (ii) the log of total energy in the lower 20 mel-frequency bands normalized by total energy, and (iii) the log of total energy in the higher 20 mel-frequency bands, normalized by total energy.

For each audio frame $x_i \in X$, the 3-dimensional pitch features $c_i$ may be (i) the warped Normalized Cross Correlation Function (NCCF), (ii) log-pitch with Probability of Voicing (POV)-weighted mean subtraction over a 1.5-second window, and (iii) the estimated derivative of the raw log pitch.

First energy $e_i$ and pitch $c_i$ for each audio frame $x_i \in X$ are concatenated. Then, the concatenated $e_i$ and $c_i$ is transformed using the linear projection $W^{ec}$ with the ReLU activation function.

$$p_i = \text{ReLU}(W^{ec}|e_i;c_i|) \quad \text{Equation (21)}$$

$P=\{p_1, p_2, \ldots, p_t\}$ as a stack of t local prosodic embeddings corresponding to t audio frames of the input audio X is generated, with each $p_i \in PP$ computed by Eq. (21).

Figure 7B:
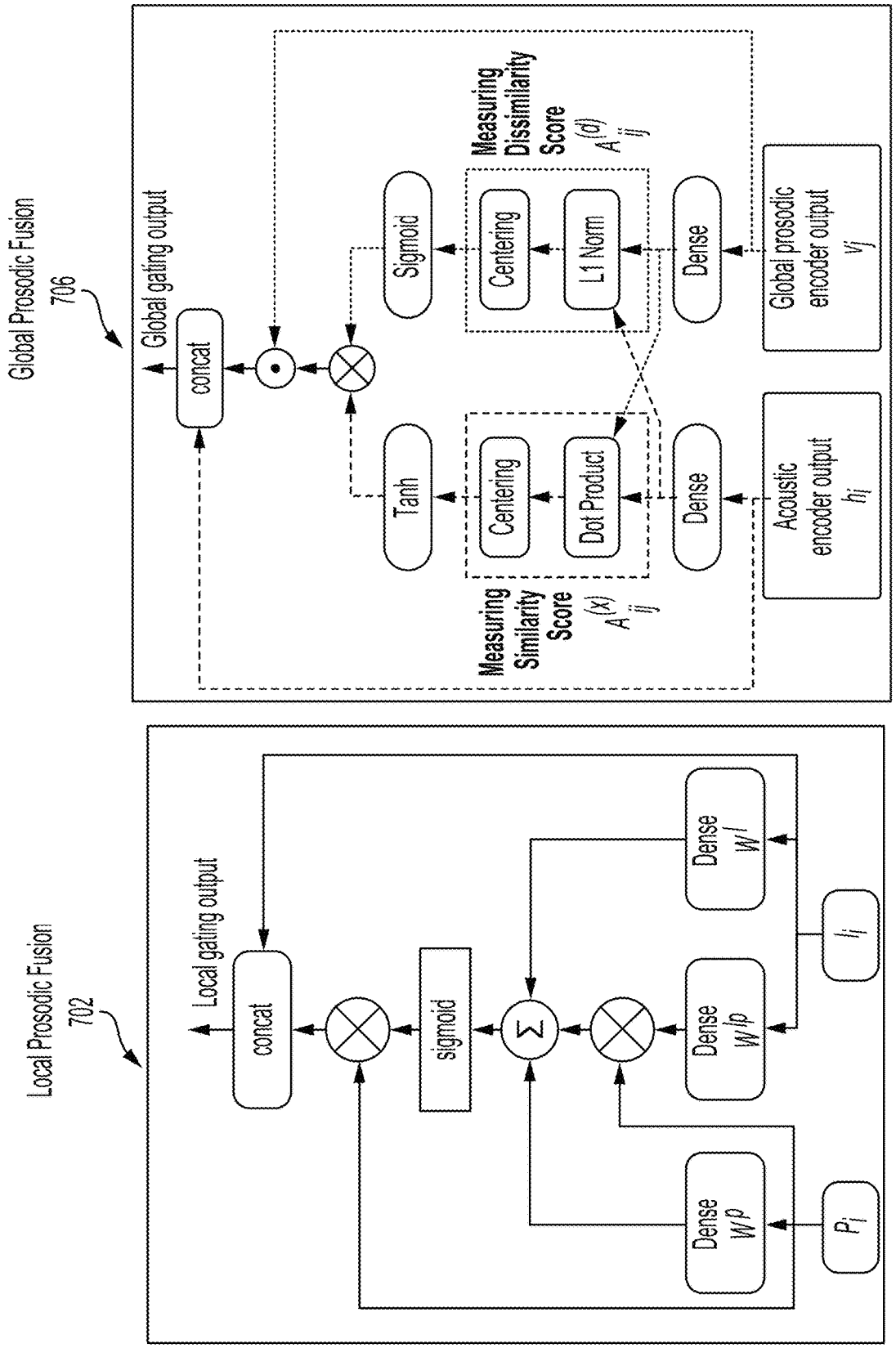
FIG. 7B is a conceptual diagram illustrating example gating components, according to embodiments of the present disclosure.

High tone/energy sounds can appear in a few segments of the whole input audio. However, these sounds cannot contribute equally to input audio or the E2E dialog act classification task. The local prosodic fusion 702 selectively combines each local prosodic features $p_i$ in Eq. (21) with LFBE features $l_i$ for each audio frame $x_i$. The local prosodic gating 702 provides a mechanism to allow the model to incorporate local prosodic features pi when needed. FIG. 7B illustrates an example architecture of the local prosodic fusion 702, which may operate as follows: With an input stack $P=\{p_1, p_2, \ldots, p_t\}$ of local prosodic features and a stack $L=\{l_1, l_2, \ldots, l_t\}$ of local LFBE features, a local prosodic gating score $\beta_i$ is computed from the transformed $p_i$, the transformed $l_i$, and the interactive features between $p_i$ and $l_i$. The gating score may be computed as follows:

$$\beta_i = \sigma(W^p p_i + W^l l_i + (W^{lp} l_i) \otimes p_i), \quad \text{Equation (22)}$$

where σ is the sigmoid function, ⊗ is the element-wise product operator, $W^p$, $W^l$, and $W^{lp}$ are learnable parameters. The local prosodic fusion 702 may output a stack $A=\{a_1, a_2, \ldots a_t\}$ of local acoustic embeddings, where $a_i$ is computed as follows:

$$a_i = [\beta_i \otimes p_i; l_i] \quad \text{Equation (23)}$$

As shown in Eq. (22) and (23), when the local prosodic gating score $\beta_i$ approaches 1, $a_1$ generalizes a simple concatenation between $p_i$ and $l_i$. In contrast, when gating score $\beta_i$ approaches 0, $a_i$ ignores prosodic signals $p_i$ and only keeps $l_i$. Hence, the local prosodic fusion 702 provides a flexible mechanism to effectively fuse $p_i$ with $l_i$.

The acoustic encoder 704 uses the local acoustic embeddings to produce global acoustic embeddings. Specifically, the inputs are the stack of fused local acoustic features $A=\{a_1, a_2, \ldots at\}$ from the local prosodic fusion 702. A is encoded using a n-layer Bi-LSTM acoustic encoder to learn the audio representations. The outputs are a stack $H=\{h_1^{(n)}, h_2^{(n)}, \ldots, h_t^{(n)}\}$ of output hidden states at the last layer n computed as follows:

$$h_i^{(k)} = W_h^{(k)}\left[\overrightarrow{LSTM}\left(h_i^{(k-1)}, \overrightarrow{h}_{i-1}^{(k)}\right); \overleftarrow{LSTM}\left(h_i^{(k-1)}, \overleftarrow{h}_{i+1}^{(k)}\right)\right] \text{ with } i \in [1, t], \overrightarrow{h}_0^{(k)} = \vec{0}, \overleftarrow{h}_{t+1}^{(k)} = \vec{0}, \text{ and } h_i^{(0)} = a_i \quad \text{Equation (24)}$$

where $\overrightarrow{h}_i^{(k)}$ and $\overleftarrow{h}_i^{(k)}$ are the hidden states at time frame i and layer k, which are learning from left-to-right and right-to-left, respectively.

The global prosodic fusion 706 may encode prosodic features from the entire audio stream and fuses them with the acoustic encoder 704 outputs as described herein. The global prosodic encoder, shown in FIG. 7B, may be a 2-D CNN model to capture global prosodic signals at varying timescales using multiple convolution filters. The output from each filter is max-pooled, stacked, and flattened, resulting in an output feature matrix V.

The global prosodic fusion 706 selectively fuses the global prosodic features V produced by the CNN encoder and the global acoustic features produced by the acoustic encoder 704. To selectively fuse the global prosodic features, a global prosodic gating layer may learn in parallel a pair-wise similarity matrix and a pair-wise dissimilarity matrix between global prosodic embeddings and global acoustic embeddings produced by the acoustic encoder 704. Under this dual affinity scheme, the pair-wise similarity matrix is followed by the tanh function, resulting in similarity scores between [−1, 1], which controls the addition and subtraction of prosodic embeddings from acoustic embeddings. The pair-wise dissimilarity matrix, on the other hand, is served as a gating mechanism that erases prosodic-acoustic similarity scores to zero when prosodic information is not necessary.

The inputs to the global prosodic fusion 706 may include global prosodic features V and global acoustic features H. As shown in FIG. 7B, each $h_i \in H$ and $v_j \in V$ are projected into a space with the same dimension. This serves the goal of measuring affinity matrices between H and V.

$$h_i' = W^h h_i, v_j' = W^v v_j \quad \text{Equation (25)}$$

Next, an affinity matrix $A^{(s)}$ is computed, which measures pair-wise similarities between H and V, where each entry $A_{ij}^{(s)}$ indicates a pair-wise similarity score between $h_i \in H$ and $v_j \in V$. $A_{ij}^{(s)}$ is measured as follows:

$$A_{ij}^{(s)} = h_i' \cdot v_j'^T \quad \text{Equation (26)}$$

Before computing $\tanh(A^{(s)})$, ensure that $A^{(s)}$ has both positive and negative values, which encapsulates both the signal addition and subtraction. Thus, first normalize $A^{(s)}$ to have a zero mean, then applying the tanh function on the normalized $A^{(s)}$.

$$S = \tanh[A^{(s)} - \text{mean}(A^{(s)})] \quad \text{Equation (27)}$$

In a same manner, an affinity matrix $A^{(d)}$ is formulated, which measures pair-wise dissimilarities between H and V.

$$A_{ij}^{(d)} = -\|h_i', v_j'\|_{l_1}, \quad \text{Equation (28)}$$

where $|.|_{l}$ indicates the $L_l$ distance between two input feature vectors. From $A^{(d)}$, a gating matrix G is formulated, which acts as a mechanism to erase unnecessary global prosodic signals by:

$$G = \sigma[A^{(d)} - \text{mean}(A^{(d)})], \quad \text{Equation (29)}$$

where σ is the sigmoid function. Since $L_l$ distance is non-negative, $\sigma(A^{(d)}) \in [0; 0.5]$. Hence, $A^{(d)}$ is normalized to have a zero mean (see Eq. 29) which ensures $G \in [0; 1]$. A matrix F as the fusion of H and V is generated by concatenating H with the attended V as follows:

$$F = [H; (S \otimes G)V] \quad \text{Equation (30)}$$

Last, a max-pooling operator is applied on F to obtain a final representation vector f=max-pooling(F) of the input audio X and use it for the dialog act classification task.

The dialog act classification component 708 may use, for each input audio X, the acoustic representation vector f as the output of the global prosodic infusion component and may produce a dialog act distribution over all D dialog acts in the input dataset. The cross entropy loss for the input audio X is defined as.

$$\hat{y}_X^{diag} = \text{softmax}(W^f f) \quad \text{Equation (31)}$$
$$\mathcal{L}_x = -\sum_{d=1}^{D} y_{X,d}^{diag} \log(\hat{y}_{X,d}^{diag})$$

The system 120 may use other components illustrated in FIGS. 1 and 6A, which are further described herein. The various components of the system 120 shown in FIGS. 1 and 6A may be located on a same or different physical devices. Communication between various components may occur directly or across the network(s) 199.

The system 120 may perform processing to facilitate user input processing and generation of an output responsive to the user input. A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 820 (shown in FIG. 8). The wakeword detection component 820 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 820 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 820 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 820 detects a wakeword, the device 110 may "wake" and begin transmitting audio data 811, representing the audio, to the system 120. The audio data 811 may include the detected wakeword, or the device 110 may remove the portion of the audio data, corresponding to the detected wakeword, prior to sending the audio data 811 to the system 120.

The foregoing describes illustrative components and processing of the system 120. The following describes illustrative components and processing of the device 110. As illustrated in FIG. 8, in at least some embodiments the system 120 may receive audio data 811 from the device 110, to recognize speech corresponding to a spoken natural language in the received audio data 811, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 820 configured to detect a wakeword (e.g., "Alexa") that indicates to the device 110 that the audio data 811 is to be processed for determining NLU output data. In at least some embodiments, a hybrid selector 824, of the device 110, may send the audio data 811 to the wakeword detection component 820. If the wakeword detection component 820 detects a wakeword in the audio data 811, the wakeword detection component 820 may send an indication of such detection to the hybrid selector 824. In response to receiving the indication, the hybrid selector 824 may send the audio data 811 to the system 120 and/or an on-device ASR component 850. The wakeword detection component 820 may also send an indication, to the hybrid selector 824, representing a wakeword was not detected. In response to receiving such an indication, the hybrid selector 824 may refrain from sending the audio data 811 to the system 120, and may prevent the ASR component 850 from processing the audio data 811. In this situation, the audio data 811 can be discarded.

The device 110 may conduct its own speech processing using on-device language processing components (such as an on-device SLU component 840, an on-device ASR component 850, and/or an on-device NLU component) similar to the manner discussed above with respect to the system-implemented ASR component 150, and NLU component. The device 110 may also internally include, or otherwise have access to, other components such as one or more skills 890 (which may process similar to the skill components 190), a user recognition component 895 (configured to process in a similar manner to the system-implemented user recognition component 195), profile storage 870 (configured to store similar profile data to the system-implemented profile storage 170), a TTS component 880 (configured to process in a similar manner to the system-implemented TTS component 180), and other components. One or more of the components may be customized/personalized for a user (or group of users) of the device 110. In at least some embodiments, the on-device profile storage 870 may only store profile data for a user or group of users specifically associated with the device 110. The device 110 may also include the context determination component 162.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 824, of the device 110, may include a hybrid proxy (HP) 826 configured to proxy traffic to/from the system 120. For example, the HP 826 may be configured to send messages to/from a hybrid execution controller (HEC) 827 of the hybrid selector 824. For example, command/directive data received from the system 120 can be sent to the HEC 827 using the HP 826. The HP 826 may also be configured to allow the audio data 811 to pass to the system 120 while also receiving (e.g., intercepting) this audio data 811 and sending the audio data 811 to the HEC 827.

In at least some embodiments, the hybrid selector 824 may further include a local request orchestrator (LRO) 828 configured to notify the ASR component 850 about the availability of the audio data 811, and to otherwise initiate the operations of on-device language processing when the audio data 811 becomes available. In general, the hybrid selector 824 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 811 is received, the HP 826 may allow the audio data 811 to pass through to the system 120 and the HP 826 may also input the audio data 811 to the ASR component 850 by routing the audio data 811 through the HEC 827 of the hybrid selector 824, whereby the LRO 828 notifies the on-device ASR component 850 of the audio data 811. At this point, the hybrid selector 824 may wait for response data from either or both the system 120 and/or the on-device language processing components. However, the disclosure is not limited thereto, and in some examples the hybrid selector 824 may send the audio data 811 only to the on-device ASR component 150 without departing from the disclosure. For example, the device 110 may process the audio data 811 on-device without sending the audio data 811 to the system 120.

The ASR component 850 is configured to receive the audio data 811 from the hybrid selector 824, and to recognize speech in the audio data 811, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 824, such as a "ReadyToExecute" response. The hybrid selector 824 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 811 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
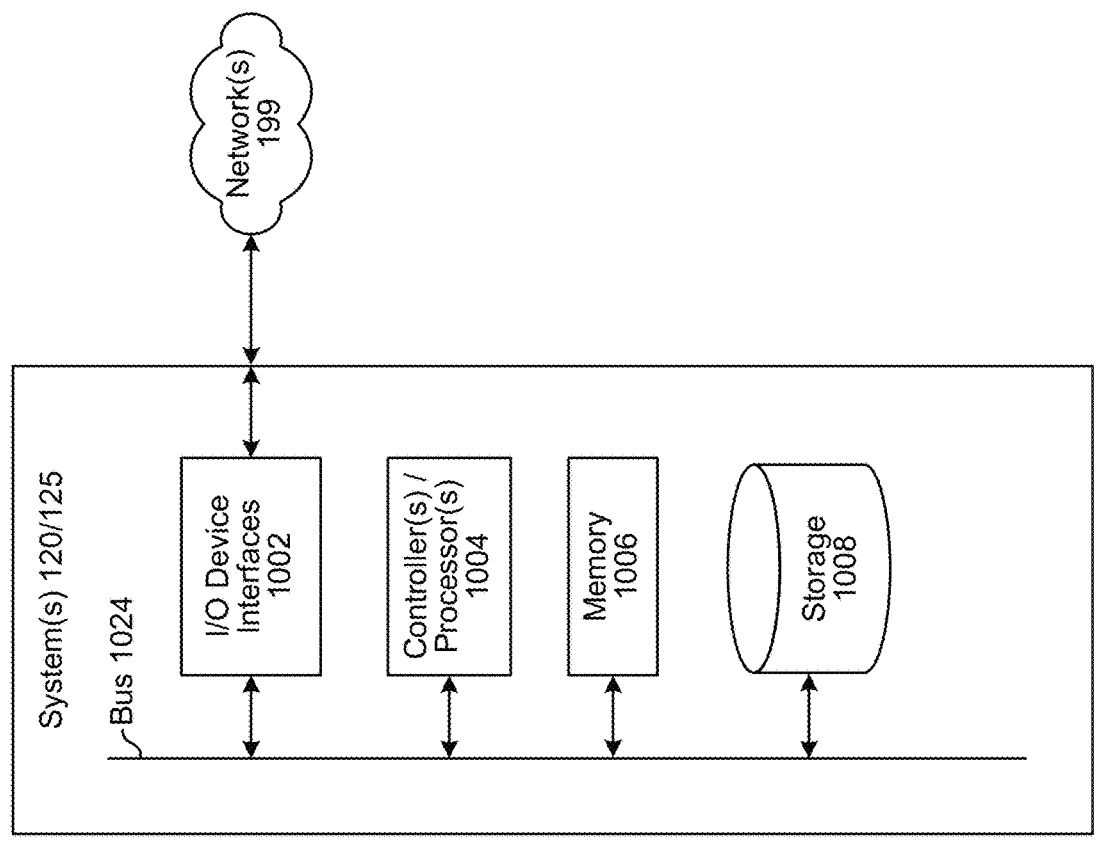
FIG. 10 is a block diagram conceptually illustrating example components of a system, according to embodiments of the present disclosure.

FIG. 9 is a block diagram conceptually illustrating a device 110 of the system 100. FIG. 10 is a block diagram conceptually illustrating example components of a system, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device 110, the system 120 and/or skill 125 may include their own dedicated processors, memory, and/or storage. Alternatively, one or more of the components of the device 110, the system 120 and/or skill 125 may utilize the I/O interfaces (902/1002), processor(s) (904/1004), memory (906/1006), and/or storage (908/1008) of the device 110, the system 120 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 125, as described herein, are illustrative, and may be located as a stand-alone device or may be included, in whole or in part, as a component of a larger device or system.

Figure 11:
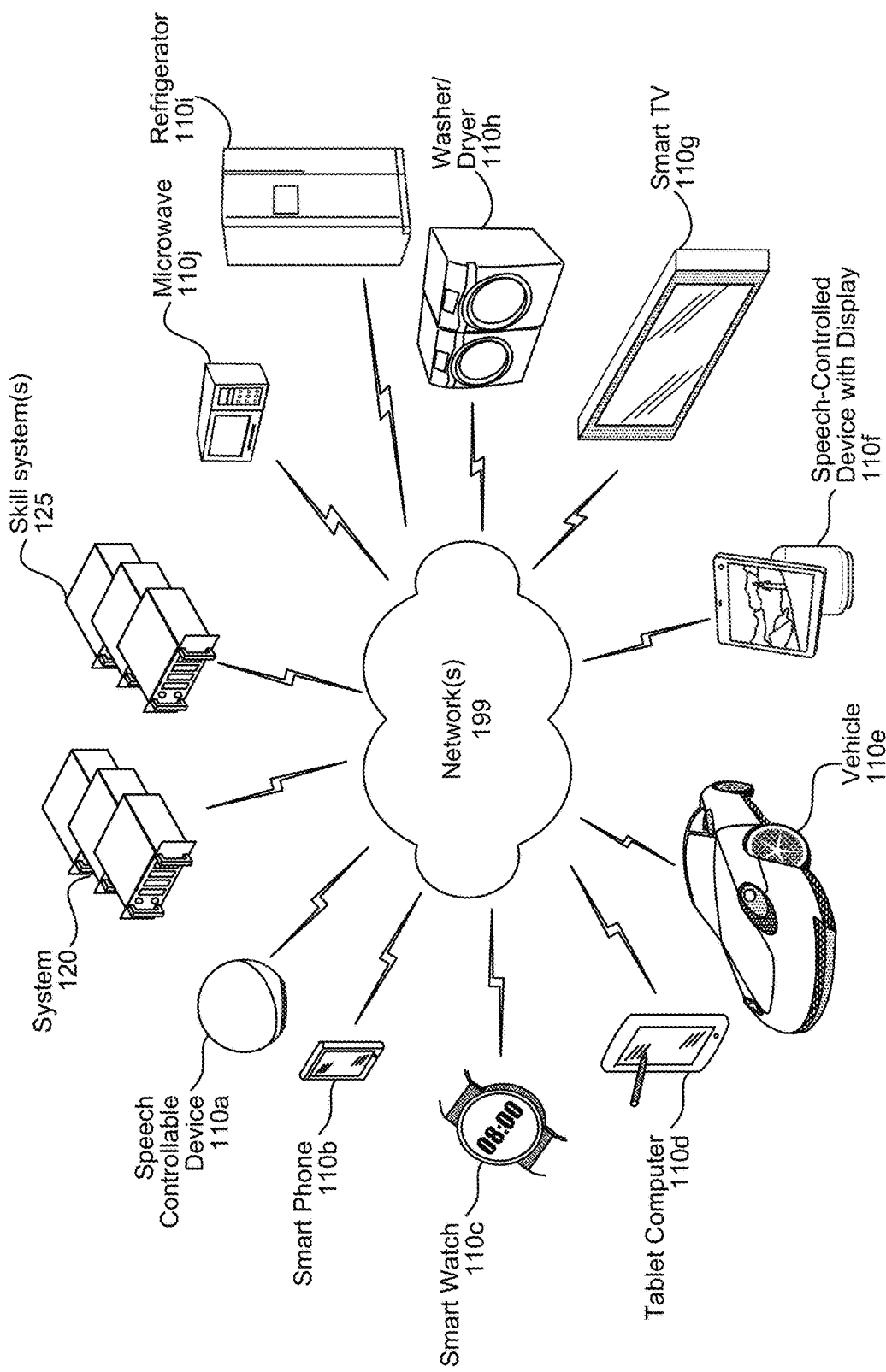
FIG. 11 illustrates an example of a computer network for use with the overall system, according to embodiments of the present disclosure.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving a first audio frame corresponding to a first portion of first audio data representing a first spoken input;
determining, using an acoustic encoder, first audio embedding data corresponding to the first audio frame;
receiving first context data representing device information;
receiving second context data representing dialog turn information;
determining, using a first context encoder configured to process device context data, first context embedding data corresponding to the first context data;
determining, using a second context encoder configured to process dialog turn context data, second context embedding data corresponding to the second context data;
determining, using a first trained machine learning (ML) model, a first context score representing a similarity between the first audio embedding data and the first context embedding data;
determining, using the first trained ML model, a second context score representing a similarity between the first audio embedding data and the second context embedding data;
identifying, in a context storage, a third context score corresponding to third context data based on processing a second audio frame received prior to the first audio frame, the second audio frame corresponding to a second portion of the first audio data;
storing, based at least in part on processing the first context score and the second context score with respect to the third context score, the first context embedding data and the first context score in the context storage;
processing, using an attention component, the first audio embedding data and at least the first context embedding data to determine combined embedding data;

processing, using one or more neural networks, at least the combined embedding data to determine intent data and entity data corresponding to the first spoken input; and determining, using the intent data and the entity data, a first output responsive to the first spoken input.

2. The computer-implemented method of claim 1, further comprising:
receiving a third audio frame corresponding to a third portion of the first audio data;
determining, using the acoustic encoder, second audio embedding data corresponding to the third audio frame;
determining, using the first trained ML model, a fourth context score representing a similarity between the second audio embedding data and the second context embedding data;
determining first memory size representing an amount of memory needed to store the second context embedding data;
based at least in part on the first memory size and memory available in the context storage, and based at least in part on processing the fourth context score with respect to the third context score, removing the third context data from the context storage; and
prior to processing the first audio embedding data using the attention component, storing the second context embedding data in the context storage.

3. The computer-implemented method of claim 1, further comprising:
receiving a third audio frame corresponding to a first portion of second audio data representing a second spoken input subsequent to the first spoken input;
determining, using the acoustic encoder, second audio embedding data corresponding to the third audio frame;
receiving fourth context data corresponding to the second spoken input;
determining, using a third context encoder, third context embedding data corresponding to the fourth context data;
determining, using the first trained ML model, a fourth context score representing a similarity between the second audio embedding data and the third context embedding data;
determining, using the first trained ML model, a fifth context score representing a similarity between the second audio embedding data and the first context embedding data stored in the context storage;
based at least in part on processing the fourth context score with respect to the fifth context score, removing the first context embedding data from the context storage;
storing the third context embedding data in the context storage;
processing, using the attention component, the second audio embedding data and at least the third embedding data stored in the context storage to determine second combined embedding data; and
processing, using the one or more neural networks, at least the second combined embedding data.

4. The computer-implemented method of claim 1, further comprising:
receiving, at a device, a third audio frame corresponding to a first portion of second audio data representing a second spoken input;
determining, using the acoustic encoder, second audio embedding data corresponding to the third audio frame;
receiving, at the device from a system, at least fourth context data and fifth context data potentially relevant to the second spoken input;
determining, using a third context encoder, third context embedding data corresponding to the fourth context data;
determining, fifth the third context encoder, fourth context embedding data corresponding to the fourth context data;
determining, at the device and using the first trained ML model, a fourth context score representing a similarity between the second audio embedding data and the third context embedding data;
determining, at the device and using the first trained ML model, a fifth context score representing a similarity between the second audio embedding data and the fourth context embedding data;
storing, at the device and based at least in part on the fourth context score satisfying a condition, the third context embedding data;
discarding the fourth context embedding data based at least in part on processing the fifth context score with respect to the fourth context score; and
performing, at the device, speech processing using at least the second audio data and the third context embedding data.

5. A computer-implemented method comprising:
receiving first input data corresponding to a first portion of a first user input;
determining first data representing an embedding of the first input data;
receiving at least first context embedding data;
determining a first context score representing a similarity between the first data and the first context embedding data;
identifying a second context score corresponding to second context embedding data based on processing second input data received prior to the first input data;
storing, based at least in part on processing the first context score and the second context score, the first context embedding data and the first context score in storage; and
based on the first context score and the second context score, processing the first context embedding data and the first user input to determine a first output responsive to the first user input.

6. The computer-implemented method of claim 5, further comprising:
receiving second input data corresponding to a second portion of the first user input, the second portion being subsequent to the first portion;
determining second data representing an embedding of the second input data;
determining a third context score representing a similarity between the second data and the first context embedding data; and
prior to processing the first user input, storing, based at least in part on processing the first context score with respect to the third context score, the second context embedding data and the third context score in the storage.

7. The computer-implemented method of claim 5, further comprising:
receiving second context embedding data;
determining a third context score representing a similarity between the first data and the second context embedding data; and based at least in part on processing the first context score with respect to the third context score, discarding the second context embedding data.

8. The computer-implemented method of claim 5, further comprising:
  determining first memory size representing an amount of memory needed to store the first context embedding data;
  determining third context data stored in the storage, the third context data corresponding to a third context score; and
  based at least in part on the first memory size and memory available in the storage, and based at least in part on processing the first context score with respect to the third context score, removing the third context embedding data from the storage prior to storing the first context embedding data.

9. The computer-implemented method of claim 5, the method further comprising:
  receiving a plurality of audio frames corresponding to the first user input;
  determining audio embedding data corresponding to the plurality of audio frames;
  processing, using an attention component, the audio embedding data and at least the first context embedding data to determine combined embedding data; and
  processing, using a spoken language understanding (SLU) component, at least the combined embedding data, wherein the SLU component includes one or more neural networks, and the SLU component is configured to determine intent data and entity data corresponding to the first user input.

10. The computer-implemented method of claim 5, wherein determining the first context score comprises:
  processing the first data and the first context embedding data using a first trained machine learning (ML) model configured to determine the similarity between the first data and the first context embedding data.

11. The computer-implemented method of claim 10, further comprising, prior to receiving the first input data:
  training the first trained ML model and a second trained ML model using a joint-training technique, wherein the second trained ML model is configured to perform SLU processing.

12. The computer-implemented method of claim 5, further comprising:
  receiving second input data corresponding to a second user input received subsequent to the first user input;
  determining second data representing an embedding of the second input data;
  determining a third context score representing a similarity between the second data and the first context embedding data stored in the storage;
  receiving third context embedding data;
  determining a fourth context score representing a similarity between the second data and the third context embedding data;
  storing, based at least in part on processing the third context score with respect to the fourth context score, the third context embedding data and the fourth context score in the storage; and
  processing the second user input and at least the third context embedding data to determine a second output responsive to the second user input.

13. A system comprising:
  at least one processor; and
  at least one memory including instructions that, when executed by the at least one processor, cause the system to:
    receive first input data corresponding to a first portion of a first user input;
    determine first data representing an embedding of the first input data;
    receive at least first context embedding data;
    determine a first context score representing a similarity between the first data and the first context embedding data;
    identify a second context score corresponding to second context embedding data based on processing second input data received prior to the first input data;
    store, based at least in part on processing the first context score and the second context score, the first context embedding data and the first context score in storage; and
    based on the first context score and the second context score, process the first context embedding data and the first user input to determine a first output responsive to the first user input.

14. The system of claim 13, wherein the at least one memory includes further instructions that, when executed by the at least one processor, further cause the system to:
  receive second input data corresponding to a second portion of the first user input, the second portion being subsequent to the first portion;
  determine second data representing an embedding of the second input data;
  determine a third context score representing a similarity between the second data and the first context embedding data; and
  prior to processing the first user input, store, based at least in part on processing the first context score with respect to the third context score, the second context embedding data and the third context score in the storage.

15. The system of claim 13, wherein the at least one memory includes further instructions that, when executed by the at least one processor, further cause the system to:
  receive second context embedding data;
  determine a third context score representing a similarity between the first data and the second context embedding data; and
  based at least in part on processing the first context score with respect to the third context score, discard the second context embedding data.

16. The system of claim 13, wherein the at least one memory includes further instructions that, when executed by the at least one processor, further cause the system to:
  determine first memory size representing an amount of memory needed to store the first context embedding data;
  determine third context data stored in the storage, the third context data corresponding to a third context score; and
  based at least in part on the first memory size and memory available in the storage, and based at least in part on processing the first context score with respect to the third context score, remove the third context embedding data from the storage prior to storing the first context embedding data.

17. The system of claim 13, wherein the at least one memory includes further instructions that, when executed by the at least one processor, further cause the system to:
  receive a plurality of audio frames corresponding to the first user input;

determine audio embedding data corresponding to the plurality of audio frames;

process, using an attention component, the audio embedding data and at least the first context embedding data to determine combined embedding data; and process, using a spoken language understanding (SLU) component, at least the combined embedding data, wherein the SLU component includes one or more neural networks, and the SLU component is configured to determine intent data and entity data corresponding to the first user input.

18. The system of claim 13, wherein the at least one memory includes further instructions that, when executed by the at least one processor, further cause the system to:

process the first data and the first context embedding data using a first trained machine learning (ML) model configured to determine the similarity between the first data and the first context embedding data.

19. The system of claim 18, wherein the at least one memory includes further instructions that, when executed by the at least one processor, further cause the system, prior to receiving the first input data, to:

training the first trained ML model and a second trained ML model using a joint-training technique, wherein the second trained ML model is configured to perform SLU processing.

20. The system of claim 13, wherein the at least one memory includes further instructions that, when executed by the at least one processor, further cause the system to:

receive second input data corresponding to a second user input received subsequent to the first user input;

determine second data representing an embedding of the second input data;

determine a third context score representing a similarity between the second data and the first context embedding data stored in the storage;

receive third context embedding data;

determine a fourth context score representing a similarity between the second data and the third context embedding data;

store, based at least in part on processing the third context score with respect to the fourth context score, the third context embedding data and the fourth context score in the storage; and process the second user input and at least the third context embedding data to determine a second output responsive to the second user input.

* * * * *